(12) United States Patent
Gong et al.

(10) Patent No.: US 9,405,097 B2
(45) Date of Patent: Aug. 2, 2016

(54) IMAGING LENS, AND ELECTRONIC APPARATUS INCLUDING THE SAME

(71) Applicant: Genius Electronic Optical Co., Ltd., Taichung (TW)

(72) Inventors: Jin-Hui Gong, Xiamen (CN); Kai-Lun Wang, Xiamen (CN); Ta-Cheng Fan, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 119 days.

(21) Appl. No.: 14/279,729

(22) Filed: May 16, 2014

(65) Prior Publication Data

US 2015/0185439 A1 Jul. 2, 2015

(30) Foreign Application Priority Data

Dec. 30, 2013 (CN) .......................... 2013 1 0746364

(51) Int. Cl.
| | | |
|---|---|---|
| *G02B 13/18* | (2006.01) | |
| *G02B 9/58* | (2006.01) | |
| *G02B 13/00* | (2006.01) | |
| *G02B 9/34* | (2006.01) | |

(52) U.S. Cl.
CPC ................ *G02B 13/004* (2013.01); *G02B 9/34* (2013.01); *G02B 9/58* (2013.01); *G02B 13/001* (2013.01)

(58) Field of Classification Search
CPC .............. G02B 9/00; G02B 9/34; G02B 9/58; G02B 13/00; G02B 13/0005; G02B 13/001; G02B 13/0015; G02B 13/002; G02B 13/004; G02B 13/005; G02B 13/0055; G02B 13/008
See application file for complete search history.

(56) References Cited

U.S. PATENT DOCUMENTS

| | | |
|---|---|---|
| 7,660,049 B2 | 2/2010 | Tang |
| 7,848,032 B1 | 12/2010 | Chen et al. |
| 7,911,715 B2 | 3/2011 | Shinohara |
| 8,014,080 B1 | 9/2011 | Chen et al. |
| 8,179,616 B1 | 5/2012 | Hsu et al. |
| 8,189,272 B1 | 5/2012 | Huang et al. |
| 8,274,593 B2 | 9/2012 | Chen et al. |
| 8,284,502 B2 | 10/2012 | Hsu et al. |
| 8,405,919 B2 | 3/2013 | Tsai et al. |
| 8,411,377 B2 | 4/2013 | Tsai et al. |
| 2011/0128615 A1* | 6/2011 | Tsai .......................... G02B 9/34 359/357 |
| 2012/0140339 A1 | 6/2012 | Huang et al. |
| 2012/0236421 A1* | 9/2012 | Tsai ..................... G02B 13/004 359/780 |
| 2013/0107378 A1 | 5/2013 | Kubota et al. |

FOREIGN PATENT DOCUMENTS

| | | |
|---|---|---|
| CN | 202929281 U | 5/2013 |
| JP | 3695449 B2 | 9/2005 |
| JP | 3870907 B2 | 1/2007 |
| TW | 201109712 A | 3/2011 |
| TW | 201212151 | 3/2012 |
| TW | 201217853 A | 5/2012 |
| TW | 201237497 A | 9/2012 |

(Continued)

*Primary Examiner* — Thong Nguyen

(74) *Attorney, Agent, or Firm* — Jianq Chyun IP Office

(57) ABSTRACT

An imaging lens includes first to fourth lens elements arranged from an object side to an image side in the given order. Through designs of surfaces of the lens elements and relevant lens parameters, a short system length of the imaging lens may be achieved while maintaining good optical performance.

16 Claims, 32 Drawing Sheets

(56) References Cited

FOREIGN PATENT DOCUMENTS

| TW | 201300828 | A | 1/2013 |
| TW | 201300829 | A | 1/2013 |
| TW | 201303352 | | 1/2013 |
| TW | 201303352 | A | 1/2013 |
| TW | 201312151 | A | 3/2013 |

* cited by examiner

| system focal length =2.004 mm, half field-of-view = 47.138°, F-number =2.50 ||||||||
|---|---|---|---|---|---|---|---|
| | surface | radius of curvature | thickness | refractive index | Abbe number | material | focal length |
| object | | ∞ | 500.00000 | | | | |
| first lens element 3 | object-side surface 31 | 1.762 | 0.341 | 1.640 | 23.529 | plastic | -83.711 |
| | image-side surface 32 | 1.577 | 0.243 | | | | |
| aperture stop 2 | | ∞ | 0.008 | | | | |
| second lens element 4 | object-side surface 41 | 8.666 | 0.279 | 1.544 | 56.114 | plastic | 4.433 |
| | image-side surface 42 | -3.320 | 0.350 | | | | |
| third lens element 5 | object-side surface 51 | -3.831 | 1.076 | 1.544 | 56.114 | plastic | 1.205 |
| | image-side surface 52 | -0.617 | 0.066 | | | | |
| fourth lens element 6 | object-side surface 61 | 1.398 | 0.346 | 1.640 | 23.529 | plastic | -1.540 |
| | image-side surface 62 | 0.524 | 0.500 | | | | |
| optical filter 7 | object-side surface 71 | ∞ | 0.210 | | | | |
| | image-side surface 72 | ∞ | 0.461 | | | | |
| image plane 8 | | ∞ | | | | | |

FIG.3

| surface | 31 | 32 | 41 | 42 |
|---|---|---|---|---|
| K | -3.270E+00 | 5.169E+00 | 0.000E+00 | -1.074E+02 |
| a4 | 2.651E-01 | 4.882E-01 | 7.867E-02 | -3.585E-01 |
| a6 | 1.632E-01 | -2.036E+00 | 2.036E-02 | 1.312E+00 |
| a8 | -3.185E-03 | 2.621E+01 | -1.103E+00 | -7.142E+00 |
| a10 | 2.840E-01 | -1.561E+02 | 3.299E+01 | 1.874E+01 |
| a12 | -1.499E+00 | 5.437E+02 | -1.336E+02 | -6.129E+00 |
| a14 | 4.6237E+00 | -9.4321E+02 | -3.7253E+02 | -8.3086E+01 |
| a16 | -4.3692E+00 | 6.1380E+02 | 2.3126E+03 | 1.3733E+02 |
| surface | 51 | 52 | 61 | 62 |
| K | 1.979E+01 | -1.237E+00 | -3.750E+01 | -4.722E+00 |
| a4 | 1.312E-01 | 3.611E-01 | -1.361E-01 | -2.149E-01 |
| a6 | -3.955E-01 | -6.467E-01 | -1.482E-01 | 1.174E-01 |
| a8 | 7.540E-01 | 3.717E-01 | 1.098E-01 | -4.841E-02 |
| a10 | 9.569E-02 | 2.536E-02 | 4.970E-02 | 1.238E-02 |
| a12 | -6.948E-01 | -6.768E-02 | -8.109E-02 | -1.233E-03 |
| a14 | -1.260E+00 | 4.909E-03 | 2.901E-02 | -1.787E-04 |
| a16 | 2.046E+00 | 9.417E-03 | -2.734E-03 | 4.050E-05 |

FIG.4

| system focal length =2.090mm, half field-of-view =45.880°, F-number =2.49 |||||||
|---|---|---|---|---|---|---|
| surface | | radius of curvature | thickness | refractive index | Abbe number | material | focal length |
| object | | ∞ | 500.00000 | | | | |
| first lens element 3 | object-side surface 31 | 1.698 | 0.517 | 1.640 | 23.529 | plastic | -46.484 |
| | image-side surface 32 | 1.415 | 0.167 | | | | |
| aperture stop 2 | | ∞ | -0.007 | | | | |
| second lens element 4 | object-side surface 41 | 10.892 | 0.372 | 1.544 | 56.114 | plastic | 4.102 |
| | image-side surface 42 | -2.785 | 0.315 | | | | |
| third lens element 5 | object-side surface 51 | -3.814 | 1.164 | 1.544 | 56.114 | plastic | 1.197 |
| | image-side surface 52 | -0.618 | 0.063 | | | | |
| fourth lens element 6 | object-side surface 61 | 1.413 | 0.350 | 1.640 | 23.529 | plastic | -1.531 |
| | image-side surface 62 | 0.525 | 0.500 | | | | |
| optical filter 7 | object-side surface 71 | ∞ | 0.210 | | | | |
| | image-side surface 72 | ∞ | 0.461 | | | | |
| image plane 8 | | ∞ | | | | | |

FIG.7

| surface | 31 | 32 | 41 | 42 |
|---|---|---|---|---|
| K | -5.554E+00 | 4.700E+00 | 0.000E+00 | -7.427E+01 |
| a4 | 2.223E-01 | 4.660E-01 | 1.194E-01 | -4.094E-01 |
| a6 | 1.085E-01 | -2.460E+00 | 4.994E-01 | 1.324E+00 |
| a8 | -5.946E-02 | 2.618E+01 | -1.401E+00 | -6.817E+00 |
| a10 | 1.968E-01 | -1.482E+02 | 3.052E+01 | 1.832E+01 |
| a12 | -1.741E+00 | 5.645E+02 | -1.188E+02 | -7.962E+00 |
| a14 | 4.2854E+00 | -8.4600E+02 | -2.5418E+02 | -8.5959E+01 |
| a16 | -3.2182E+00 | -3.1000E+02 | 1.71138E+03 | 1.5193E+02 |
| surface | 51 | 52 | 61 | 62 |
| K | 1.974E+01 | -1.246E+00 | -3.657E+01 | -4.734E+00 |
| a4 | 1.460E-01 | 3.615E-01 | -1.369E-01 | -2.176E-01 |
| a6 | -3.910E-01 | -6.474E-01 | -1.476E-01 | 1.166E-01 |
| a8 | 7.415E-01 | 3.688E-01 | 1.102E-01 | -4.837E-02 |
| a10 | 8.392E-02 | 2.189E-02 | 4.991E-02 | 1.241E-02 |
| a12 | -6.810E-01 | -7.058E-02 | -8.127E-02 | -1.228E-03 |
| a14 | -1.182E+00 | 2.720E-03 | 2.896E-02 | -1.776E-04 |
| a16 | 1.889E+00 | 7.450E-03 | -2.776E-03 | 4.072E-05 |

FIG.8 system focal length =1.929mm, half field-of-view =49.294°, F-number =2.48

| | surface | radius of curvature | thickness | refractive index | Abbe number | material | focal length |
|---|---|---|---|---|---|---|---|
| object | | ∞ | 500.00000 | | | | |
| first lens element 3 | object-side surface 31 | 1.982 | 0.244 | 1.640 | 23.529 | plastic | -15.975 |
| | image-side surface 32 | 1.582 | 0.227 | | | | |
| aperture stop 2 | | ∞ | 0.006 | | | | |
| second lens element 4 | object-side surface 41 | 6.727 | 0.297 | 1.544 | 56.114 | plastic | 3.730 |
| | image-side surface 42 | -2.875 | 0.335 | | | | |
| third lens element 5 | object-side surface 51 | -3.815 | 1.110 | 1.544 | 56.114 | plastic | 1.202 |
| | image-side surface 52 | -0.617 | 0.065 | | | | |
| fourth lens element 6 | object-side surface 61 | 1.407 | 0.356 | 1.640 | 23.529 | plastic | -1.529 |
| | image-side surface 62 | 0.522 | 0.500 | | | | |
| optical filter 7 | object-side surface 71 | ∞ | 0.210 | | | | |
| | image-side surface 72 | ∞ | 0.461 | | | | |
| image plane 8 | | ∞ | | | | | |

FIG.11

| surface | 31 | 32 | 41 | 42 |
|---|---|---|---|---|
| K | -2.150E+00 | 5.066E+00 | 0.000E+00 | -7.760E+01 |
| a4 | 2.765E-01 | 4.866E-01 | 9.600E-02 | -3.721E-01 |
| a6 | 1.436E-01 | -2.047E+00 | -2.489E-02 | 1.294E+00 |
| a8 | -5.510E-02 | 2.604E+01 | -1.610E+00 | -7.188E+00 |
| a10 | 2.026E-01 | -1.571E+02 | 3.046E+01 | 1.844E+01 |
| a12 | -1.672E+00 | 5.385E+02 | -1.421E+02 | -7.255E+00 |
| a14 | 4.0401E+00 | -9.7398E+02 | -3.8508E+02 | -8.6603E+01 |
| a16 | -6.5781E+00 | 4.6951E+02 | 2.4466E+03 | 1.3099E+02 |
| surface | 51 | 52 | 61 | 62 |
| K | 1.991E+01 | -1.235E+00 | -3.439E+01 | -4.478E+00 |
| a4 | 1.378E-01 | 3.603E-01 | -1.374E-01 | -2.069E-01 |
| a6 | -3.959E-01 | -6.491E-01 | -1.472E-01 | 1.212E-01 |
| a8 | 7.528E-01 | 3.706E-01 | 1.124E-01 | -4.904E-02 |
| a10 | 1.010E-01 | 2.538E-02 | 5.022E-02 | 1.241E-02 |
| a12 | -6.816E-01 | -6.698E-02 | -8.121E-02 | -1.215E-03 |
| a14 | -1.250E+00 | 5.937E-03 | 2.889E-02 | -1.768E-04 |
| a16 | 2.001E+00 | 1.056E-02 | -2.769E-03 | 3.914E-05 |

FIG.12 system focal length =2.128mm, half field-of-view =46.406°, F-number =2.42

| | surface | radius of curvature | thickness | refractive index | Abbe number | material | focal length |
|---|---|---|---|---|---|---|---|
| object | | ∞ | 500.00000 | | | | |
| first lens element 3 | object-side surface 31 | 1.791 | 0.350 | 1.640 | 23.529 | plastic | -24.598 |
| | image-side surface 32 | 1.486 | 0.293 | | | | |
| aperture stop 2 | | ∞ | 0.004 | | | | |
| second lens element 4 | object-side surface 41 | 6.926 | 0.382 | 1.544 | 56.114 | plastic | 4.269 |
| | image-side surface 42 | -3.445 | 0.217 | | | | |
| third lens element 5 | object-side surface 51 | -4.023 | 1.312 | 1.544 | 56.114 | plastic | 1.199 |
| | image-side surface 52 | -0.628 | 0.050 | | | | |
| fourth lens element 6 | object-side surface 61 | 1.440 | 0.338 | 1.640 | 23.529 | plastic | -1.558 |
| | image-side surface 62 | 0.537 | 0.500 | | | | |
| optical filter 7 | object-side surface 71 | ∞ | 0.210 | | | | |
| | image-side surface 72 | ∞ | 0.597 | | | | |
| image plane 8 | | ∞ | | | | | |

FIG.15

| surface | 31 | 32 | 41 | 42 |
|---|---|---|---|---|
| K | -2.225E+00 | 5.410E+00 | 0.000E+00 | -8.663E+01 |
| a4 | 2.745E-01 | 4.851E-01 | 1.062E-01 | -3.586E-01 |
| a6 | 1.759E-01 | -2.034E+00 | -3.414E-02 | 1.350E+00 |
| a8 | 2.556E-02 | 2.600E+01 | -1.332E+00 | -7.039E+00 |
| a10 | 2.318E-01 | -1.572E+02 | 3.415E+01 | 1.887E+01 |
| a12 | -1.657E+00 | 5.445E+02 | -1.181E+02 | -6.176E+00 |
| a14 | 4.7917E+00 | -9.0631E+02 | -2.9520E+02 | -8.5137E+01 |
| a16 | -2.74404E+00 | 6.8097E+02 | 1.5247E+03 | 1.3028E+02 |
| surface | 51 | 52 | 61 | 62 |
| K | 2.062E+01 | -1.269E+00 | -3.882E+01 | -5.024E+00 |
| a4 | 1.308E-01 | 3.739E-01 | -1.314E-01 | -2.172E-01 |
| a6 | -4.245E-01 | -6.369E-01 | -1.548E-01 | 1.176E-01 |
| a8 | 7.224E-01 | 3.704E-01 | 1.067E-01 | -4.874E-02 |
| a10 | 8.151E-02 | 1.853E-02 | 4.916E-02 | 1.229E-02 |
| a12 | -7.114E-01 | -7.389E-02 | -8.101E-02 | -1.243E-03 |
| a14 | -1.384E+00 | 2.489E-03 | 2.914E-02 | -1.774E-04 |
| a16 | 1.590E+00 | 1.041E-02 | -2.658E-03 | 4.128E-05 |

FIG.16

| system focal length =2.361mm, half field-of-view =43.78°, F-number =2.60 | | | | | | | |
|---|---|---|---|---|---|---|---|
| | surface | radius of curvature | thickness | refractive index | Abbe number | material | focal length |
| object | | ∞ | 500.00000 | | | | |
| first lens element 3 | object-side surface 31 | 1.781 | 0.390 | 1.640 | 23.529 | plastic | -260.040 |
| | image-side surface 32 | 1.611 | 0.249 | | | | |
| aperture stop 2 | | ∞ | 0.017 | | | | |
| second lens element 4 | object-side surface 41 | 13.645 | 0.309 | 1.544 | 56.114 | plastic | 4.459 |
| | image-side surface 42 | -2.940 | 0.516 | | | | |
| third lens element 5 | object-side surface 51 | -2.793 | 0.472 | 1.544 | 56.114 | plastic | 2.007 |
| | image-side surface 52 | -0.834 | 0.050 | | | | |
| fourth lens element 6 | object-side surface 61 | 4.608 | 0.300 | 1.640 | 23.529 | plastic | -4.293 |
| | image-side surface 62 | 1.685 | 0.350 | | | | |
| optical filter 7 | object-side surface 71 | ∞ | 0.210 | | | | |
| | image-side surface 72 | ∞ | 1.014 | | | | |
| image plane 8 | | ∞ | | | | | |

FIG.19

| surface | 31 | 32 | 41 | 42 |
|---|---|---|---|---|
| K | -3.255E+00 | 5.256E+00 | 0.000E+00 | 1.782E+01 |
| a4 | 2.112E-01 | 4.520E-01 | 3.608E-02 | -1.768E-01 |
| a6 | 8.331E-02 | -2.605E+00 | -1.151E-01 | 8.748E-01 |
| a8 | 1.432E-01 | 2.684E+01 | -2.555E+00 | -7.531E+00 |
| a10 | 1.901E-01 | -1.154E+02 | 2.879E+01 | 1.917E+01 |
| a12 | -1.960E+00 | 1.991E+02 | -1.101E+02 | -2.929E+00 |
| a14 | 4.6097E+00 | 1.8543E+02 | 5.4697E+01 | -7.9955E+01 |
| a16 | -3.1185E+00 | -6.5588E+02 | 3.0002E+02 | 1.0312E+02 |
| surface | 51 | 52 | 61 | 62 |
| K | 9.006E+00 | -1.116E+00 | 5.194E+00 | -1.524E+01 |
| a4 | 1.935E-01 | 3.204E-01 | -1.981E-01 | -1.895E-01 |
| a6 | -3.523E-01 | -6.313E-01 | -8.036E-02 | 1.049E-01 |
| a8 | 3.002E-01 | 4.916E-01 | 1.173E-01 | -4.659E-02 |
| a10 | 1.934E-01 | 8.897E-02 | 3.962E-02 | 1.241E-02 |
| a12 | -3.604E-02 | -9.878E-02 | -9.001E-02 | -1.639E-03 |
| a14 | -7.247E-01 | -3.235E-02 | 2.705E-02 | -4.120E-04 |
| a16 | 6.307E-01 | 1.863E-02 | 6.316E-04 | 3.420E-05 |

FIG.20 system focal length =2.077mm, half field-of-view =47.748°, F-number =2.42

| surface | | radius of curvature | thickness | refractive index | Abbe number | material | focal length |
|---|---|---|---|---|---|---|---|
| object | | ∞ | 500.00000 | | | | |
| first lens element 3 | object-side surface 31 | 1.785 | 0.338 | 1.640 | 23.529 | plastic | -106.060 |
| | image-side surface 32 | 1.610 | 0.270 | | | | |
| aperture stop 2 | | ∞ | 0.020 | | | | |
| second lens element 4 | object-side surface 41 | 7.030 | 0.364 | 1.544 | 56.114 | plastic | 4.535 |
| | image-side surface 42 | -3.752 | 0.360 | | | | |
| third lens element 5 | object-side surface 51 | -3.814 | 0.917 | 1.544 | 56.114 | plastic | 1.244 |
| | image-side surface 52 | -0.625 | 0.056 | | | | |
| fourth lens element 6 | object-side surface 61 | 1.413 | 0.346 | 1.640 | 23.529 | plastic | -1.546 |
| | image-side surface 62 | 0.528 | 0.500 | | | | |
| optical filter 7 | object-side surface 71 | ∞ | 0.210 | | | | |
| | image-side surface 72 | ∞ | 0.458 | | | | |
| image plane 8 | | | | | | | |

FIG.23

| surface | 31 | 32 | 41 | 42 |
|---|---|---|---|---|
| K | -2.969E+00 | 5.036E+00 | 0.000E+00 | -9.617E+01 |
| a4 | 2.646E-01 | 4.660E-01 | 7.736E-02 | -3.816E-01 |
| a6 | 1.595E-01 | -2.031E+00 | -8.170E-02 | 1.267E+00 |
| a8 | -1.815E-03 | 2.618E+01 | -1.152E+00 | -7.094E+00 |
| a10 | 3.005E-01 | -1.556E+02 | 3.349E+01 | 1.897E+01 |
| a12 | -1.429E+00 | 5.496E+02 | -1.336E+02 | -6.033E+00 |
| a14 | 4.8919E+00 | -9.1672E+02 | -3.8948E+02 | -8.4781E+01 |
| a16 | -3.4786E+00 | 6.3995E+02 | 2.1669E+03 | 1.2994E+02 |
| surface | 51 | 52 | 61 | 62 |
| K | 1.886E+01 | -1.278E+00 | -3.243E+01 | -4.515E+00 |
| a4 | 1.111E-01 | 3.707E-01 | -1.171E-01 | -2.158E-01 |
| a6 | -4.116E-01 | -6.388E-01 | -1.469E-01 | 1.162E-01 |
| a8 | 7.446E-01 | 3.796E-01 | 1.094E-01 | -4.870E-02 |
| a10 | 1.002E-01 | 3.019E-02 | 4.943E-02 | 1.234E-02 |
| a12 | -6.800E-01 | -6.575E-02 | -8.123E-02 | -1.243E-03 |
| a14 | -1.267E+00 | 4.876E-03 | 2.893E-02 | -1.807E-04 |
| a16 | 1.919E+00 | 8.341E-03 | -2.791E-03 | 4.035E-05 |

FIG.24 system focal length =2.464mm, half field-of-view =42.503°, F-number =2.61

| surface | | radius of curvature | thickness | refractive index | Abbe number | material | focal length |
|---|---|---|---|---|---|---|---|
| object | | ∞ | 500.00000 | | | | |
| aperture stop 2 | | ∞ | -0.059 | | | | |
| first lens element 3 | object-side surface 31 | 1.358 | 0.200 | 1.640 | 23.529 | plastic | 129.010 |
| | image-side surface 32 | 1.301 | 0.085 | | | | |
| second lens element 4 | object-side surface 41 | 2.265 | 0.279 | 1.544 | 56.114 | plastic | 4.197 |
| | image-side surface 42 | 186.173 | 0.559 | | | | |
| third lens element 5 | object-side surface 51 | -2.503 | 0.820 | 1.544 | 56.114 | plastic | 1.644 |
| | image-side surface 52 | -0.737 | 0.050 | | | | |
| fourth lens element 6 | object-side surface 61 | 0.727 | 0.212 | 1.640 | 23.529 | plastic | -2.187 |
| | image-side surface 62 | 0.425 | 0.500 | | | | |
| optical filter 7 | object-side surface 71 | ∞ | 0.210 | | | | |
| | image-side surface 72 | ∞ | 0.728 | | | | |
| image plane 8 | | | | | | | |

FIG.27

| surface | 31 | 32 | 41 | 42 |
|---|---|---|---|---|
| K | -1.781E+00 | -2.859E-01 | 0.000E+00 | 7.354E+04 |
| a4 | -7.101E-02 | -7.993E-02 | -1.352E-01 | -1.263E-01 |
| a6 | 1.617E-01 | -2.899E+00 | 1.489E-01 | 1.243E+00 |
| a8 | 1.335E+00 | 2.901E+01 | -2.918E+00 | -7.894E+00 |
| a10 | -8.548E+00 | -1.197E+02 | 2.927E+01 | 2.034E+01 |
| a12 | -1.007E+01 | 1.887E+02 | -9.297E+01 | 7.968E-01 |
| a14 | 1.8089E+02 | 5.4915E+01 | 7.1958E+01 | -8.4673E+01 |
| a16 | -3.5224E+02 | -3.1164E+02 | 6.1804E+01 | 9.6770E+01 |
| surface | 51 | 52 | 61 | 62 |
| K | 5.791E+00 | -1.132E+00 | -6.270E+00 | -3.155E+00 |
| a4 | 1.205E-01 | 4.313E-01 | -1.041E-01 | -1.935E-01 |
| a6 | -5.048E-01 | -7.536E-01 | -1.032E-01 | 9.467E-02 |
| a8 | 4.549E-01 | 4.201E-01 | 4.518E-02 | -4.058E-02 |
| a10 | -4.046E-01 | 5.888E-02 | 5.743E-02 | 1.067E-02 |
| a12 | 1.477E+00 | -1.780E-01 | -6.983E-02 | -8.242E-04 |
| a14 | -2.147E+00 | -8.478E-03 | 3.171E-02 | -1.430E-04 |
| a16 | 1.206E+00 | 6.123E-02 | -5.549E-03 | 1.155E-05 |

FIG.28

| relationship | first preferred embodiment | second preferred embodiment | third preferred embodiment | fourth preferred embodiment | fifth preferred embodiment | sixth preferred embodiment | seventh preferred embodiment |
|---|---|---|---|---|---|---|---|
| T1 | 0.34 | 0.52 | 0.24 | 0.35 | 0.39 | 0.34 | 0.20 |
| G12 | 0.25 | 0.16 | 0.23 | 0.30 | 0.27 | 0.29 | 0.09 |
| T2 | 0.28 | 0.37 | 0.30 | 0.38 | 0.31 | 0.36 | 0.28 |
| G23 | 0.35 | 0.32 | 0.34 | 0.22 | 0.52 | 0.36 | 0.56 |
| T3 | 1.08 | 1.16 | 1.11 | 1.31 | 0.47 | 0.92 | 0.82 |
| T4 | 0.35 | 0.35 | 0.36 | 0.34 | 0.30 | 0.35 | 0.21 |
| BFL | 1.17 | 1.17 | 1.17 | 1.31 | 1.57 | 1.17 | 1.44 |
| ALT | 2.04 | 2.40 | 2.01 | 2.38 | 1.47 | 1.97 | 1.51 |
| Gaa | 0.67 | 0.54 | 0.63 | 0.56 | 0.83 | 0.71 | 0.69 |
| TTL | 3.88 | 4.11 | 3.81 | 4.25 | 3.88 | 3.84 | 3.64 |
| EFL | 2.00 | 2.09 | 1.93 | 2.13 | 2.36 | 2.08 | 2.46 |
| BFL/G23 | 3.35 | 3.72 | 3.50 | 6.02 | 3.05 | 3.24 | 2.57 |
| EFL/T3 | 1.86 | 1.80 | 1.74 | 1.62 | 5.00 | 2.26 | 3.00 |
| BFL/T1 | 3.43 | 2.26 | 4.80 | 3.73 | 4.04 | 3.46 | 7.19 |
| BFL/G12 | 4.67 | 7.32 | 5.03 | 4.40 | 5.92 | 4.03 | 16.92 |
| ALT/G23 | 5.83 | 7.63 | 5.99 | 10.98 | 2.85 | 5.46 | 2.70 |
| ALT/G12 | 8.14 | 15.02 | 8.61 | 8.02 | 5.53 | 6.78 | 17.78 |
| T3/Gaa | 1.61 | 2.16 | 1.75 | 2.33 | 0.57 | 1.30 | 1.18 |
| T3/G23 | 3.07 | 3.70 | 3.31 | 6.05 | 0.91 | 2.55 | 1.47 |
| ALT/T2 | 7.32 | 6.46 | 6.76 | 6.24 | 4.76 | 5.40 | 5.42 |
| ALT/T1 | 5.99 | 4.65 | 8.23 | 6.81 | 3.77 | 5.81 | 7.56 |
| T3/G12 | 4.29 | 7.28 | 4.76 | 4.42 | 1.77 | 3.16 | 9.65 |
| T3/T4 | 3.11 | 3.33 | 3.12 | 3.88 | 1.57 | 2.65 | 3.87 |

FIG.30

IMAGING LENS, AND ELECTRONIC APPARATUS INCLUDING THE SAME

CROSS-REFERENCE TO RELATED APPLICATION

This application claims priority to Chinese Application No. 201310746364.X, filed on Dec. 30, 2013.

BACKGROUND OF THE INVENTION

1. Field of the Invention

The present invention relates to an imaging lens and an electronic apparatus including the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

Each of U.S. Pat. Nos. 7,848,032, 8,284,502, 8,179,616, and Taiwanese patent publication no. 201109712 discloses a conventional imaging lens that includes four lens elements, and that has a system length of over 8 mm. Particularly, the imaging lens disclosed in U.S. Pat. No. 8,179,616 has a system length of over 11 mm, which disfavors reducing thickness of portable electronic devices, such as mobile phones and digital cameras.

Reducing the system length of the imaging lens while maintaining satisfactory optical performance is always a goal in the industry.

SUMMARY OF THE INVENTION

Therefore, an object of the present invention is to provide an imaging lens having a shorter overall length while maintaining good optical performance.

According to one aspect of the present invention, an imaging lens comprises a first lens element, a second lens element, a third lens element and a fourth lens element arranged in order from an object side to an image side along an optical axis of the imaging lens. Each of the first lens element, the second lens element, the third lens element and the fourth lens element has a refractive power, an object-side surface facing toward the object side, and an image-side surface facing toward the image side.

The image-side surface of the first lens element has a concave portion in a vicinity of a periphery of the first lens element.

The second lens element has a positive refractive power.

The image-side surface of the third lens element has a convex portion in a vicinity of the optical axis.

The image-side surface of the fourth lens element has a concave portion in a vicinity of the optical axis, and a convex portion in a vicinity of a periphery of the fourth lens element.

The imaging lens does not include any lens element with refractive power other than the first lens element, the second lens element, the third lens element and the fourth lens element.

The imaging lens satisfies $2.5 \leq BFL/G23$, where BFL represents a distance at the optical axis between the image-side surface of the fourth lens element and an image plane at the image side, and G23 represents an air gap length between the second lens element and the third lens element at the optical axis.

Another object of the present invention is to provide an electronic apparatus having an imaging lens with four lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical parameters corresponding to the imaging lens of the first preferred embodiment;

FIG. 4 shows values of some parameters of an optical relationship corresponding to the imaging lens of the first preferred embodiment;

FIG. 7 shows values of some optical parameters corresponding to the imaging lens of the second preferred embodiment;

FIG. 8 shows values of some parameters of an optical relationship corresponding to the imaging lens of the second preferred embodiment;

FIG. 11 shows values of some optical parameters corresponding to the imaging lens of the third preferred embodiment;

FIG. 12 shows values of some parameters of an optical relationship corresponding to the imaging lens of the third preferred embodiment;

FIG. 15 shows values of some optical parameters corresponding to the imaging lens of the fourth preferred embodiment;

FIG. 16 shows values of some parameters of an optical relationship corresponding to the imaging lens of the fourth preferred embodiment;

FIG. 19 shows values of some optical parameters corresponding to the imaging lens of the fifth preferred embodiment;

FIG. 20 shows values of some parameters of an optical relationship corresponding to the imaging lens of the fifth preferred embodiment;

FIG. 23 shows values of some optical parameters corresponding to the imaging lens of the sixth preferred embodiment;

FIG. 24 shows values of some parameters of an optical relationship corresponding to the imaging lens of the sixth preferred embodiment;

FIG. 27 shows values of some optical parameters corresponding to the imaging lens of the seventh preferred embodiment;

FIG. 28 shows values of some parameters of an optical relationship corresponding to the imaging lens of the seventh preferred embodiment;

FIG. 30 is a table that lists values of parameters of other optical relationships corresponding to the imaging lenses of the first to seventh preferred embodiments;

DETAILED DESCRIPTION OF THE PREFERRED EMBODIMENTS

Figure 1:
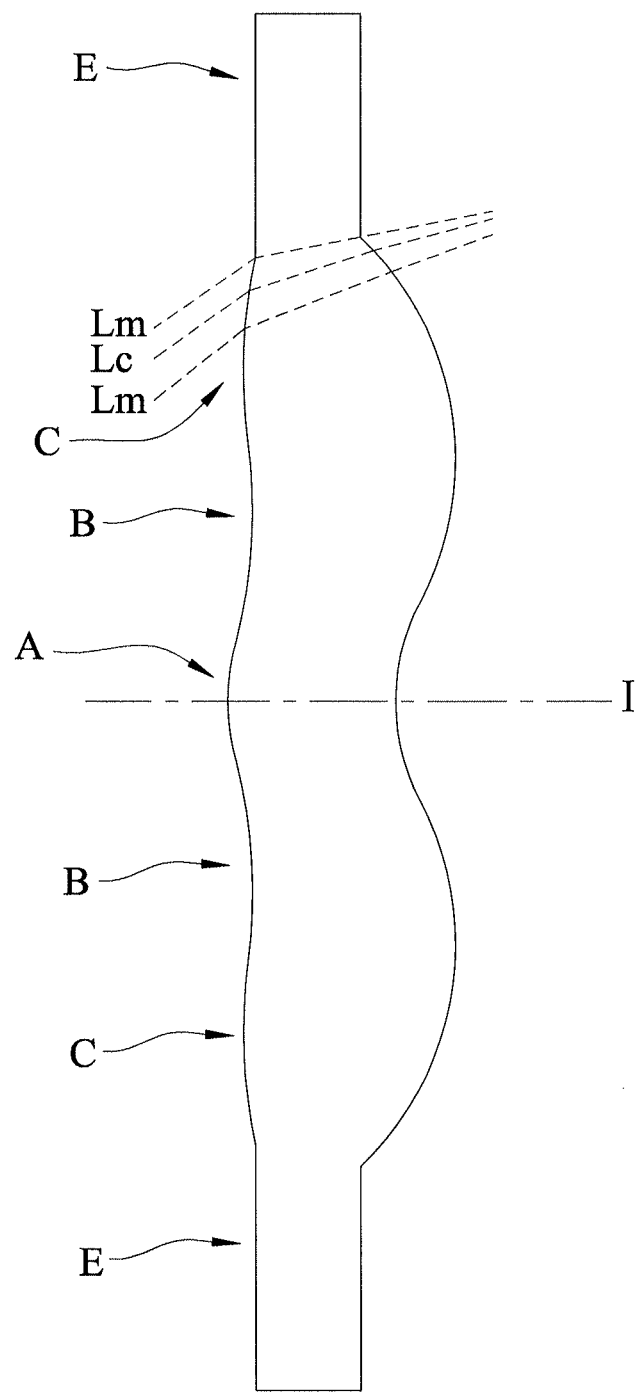
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
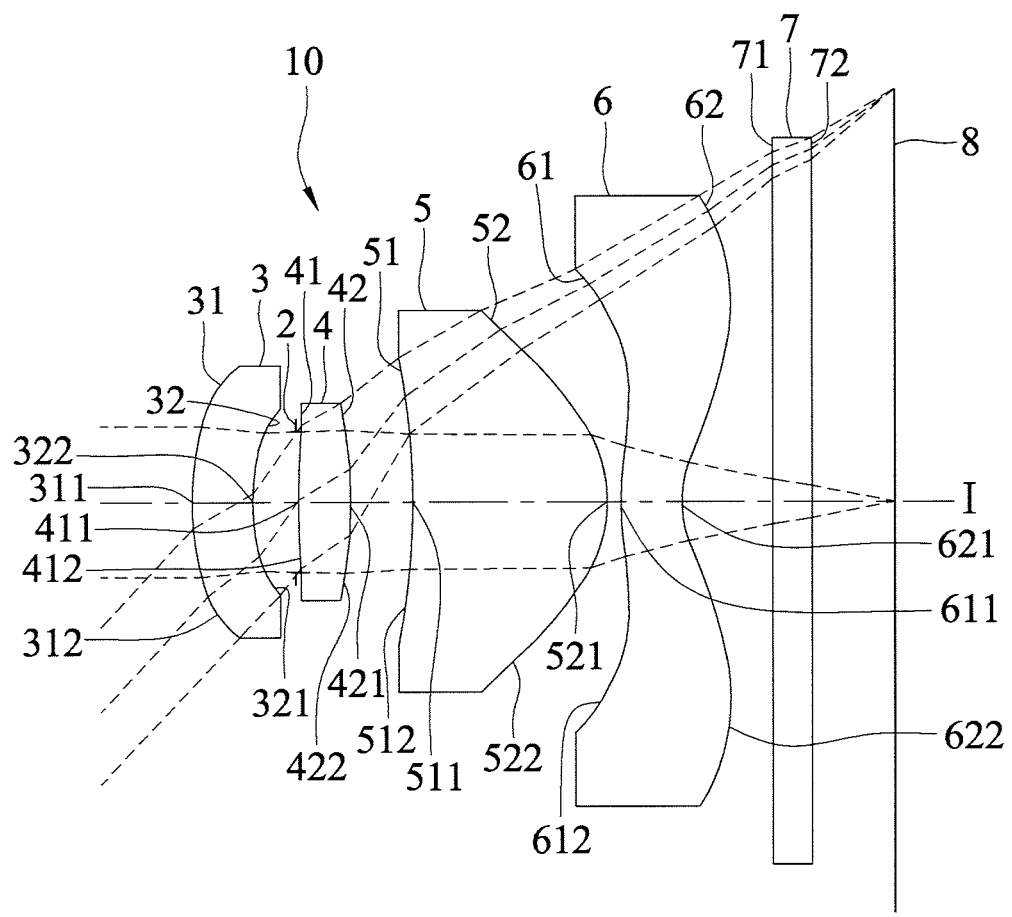
FIG. 2 is a schematic diagram that illustrates the first preferred embodiment of an imaging lens according to the present invention.

Referring to FIG. 2, the first preferred embodiment of an imaging lens 10 according to the present invention includes a first lens element 3, an aperture stop 2, a second lens element 4, a third lens element 5, a fourth lens element 6, and an optical filter 7 arranged in the given order along an optical axis (I) from an object side to an image side. The optical filter 7 is an infrared cut filter for selectively absorbing infrared light to thereby reduce imperfection of images formed at an image plane 8.

Each of the first, second, third and fourth lens elements 3-6 and the optical filter 7 has an object-side surface 31, 41, 51, 61, 71 facing the object side, and an image-side surface 32, 42, 52, 62, 72 facing toward the image side. Light entering the imaging lens 10 travels through the object-side and image-side surfaces 31, 32 of the first lens element 3, the aperture stop 2, the object-side and image-side surfaces 41, 42 of the second lens element 4, the object-side and image-side surfaces 51, 52 of the third lens element 5, the object-side and image-side surfaces 61, 62 of the fourth lens element 6, and the object-side and image-side surfaces 71, 72 of the optical filter 7, in the given order, to form an image on the image plane 8. Each of the object-side surfaces 31, 41, 51, 61 and the image-side surfaces 32, 42, 52, 62 is aspherical and has a center point coinciding with the optical axis (I).

It should be noted that the present invention uses an image sensor (not shown) packaged using COB (chip on board) techniques. Compared to the conventional CSP (chip scale package), a cover glass is not required for the COB technique. Hence, the imaging lens of the present invention does not include the cover glass, but the present invention should not be limited in this respect.

In the first preferred embodiment, which is depicted in FIG. 2, the first lens element 3 has a negative refractive power. The object-side surface 31 of the first lens element 3 is a convex surface that has a convex portion 311 in a vicinity of the optical axis (I) and a convex portion 312 in a vicinity of a periphery of the first lens element 3. The image-side surface 32 of the first lens element 3 is a concave surface that has a concave portion 322 in a vicinity of the optical axis (I) and a concave portion 321 in a vicinity of a periphery of the first lens element 3.

The second lens element 4 has a positive refractive power. The object-side surface 41 of the second lens element 4 is a convex surface that has a convex portion 411 in a vicinity of the optical axis (I) and a convex portion 412 in a vicinity of a periphery of the second lens element 4. The image-side surface 42 of the second lens element 4 is a convex surface that has a convex portion 421 in a vicinity of the optical axis (I) and a convex portion 422 in a vicinity of a periphery of the second lens element 4.

The third lens element 5 has a positive refractive power. The object-side surface 51 of the third lens element 5 is a concave surface that has a concave portion 511 in a vicinity of the optical axis (I) and a concave portion 512 in a vicinity of a periphery of the third lens element 5. The image-side surface 52 of the third lens element 5 is a convex surface that has a convex portion 521 in a vicinity of the optical axis (I) and a convex portion 522 in a vicinity of a periphery of the third lens element 5.

The fourth lens element 6 has a negative refractive power. The object-side surface 61 of the fourth lens element 6 has a convex portion 611 in a vicinity of the optical axis (I), and a concave portion 612 in a vicinity of a periphery of the fourth lens element 6. The image-side surface 62 of the fourth lens element 6 has a concave portion 621 in a vicinity of the optical axis (I), and a convex portion 622 in a vicinity of the periphery of the fourth lens element 6.

In the first preferred embodiment, the imaging lens 10 does not include any lens element with refractive power other than the aforesaid lens elements 3-6.

Shown in FIG. 3 is a table that lists values of some optical parameters corresponding to the surfaces 31, 41, 51, 61, 71, 32, 42, 52, 62, 72 of the first preferred embodiment. The imaging lens 10 has an overall system effective focal length (EFL) of 2.004 mm, a half field-of-view (HFOV) of 47.138°, an F-number of 2.50, and a system length of 3.88 mm. The system length refers to a distance between the object-side surface 31 of the first lens element 3 and the image plane 8 at the optical axis (I).

In this embodiment, each of the object-side surfaces 31-61 and the image-side surfaces 32-62 is aspherical, and satisfies the relationship of $$Z(Y) = \frac{Y^2}{R} \Big/ \left(1 + \sqrt{1-(1+K)\frac{Y^2}{R^2}}\right) + \sum_{i=1}^{n} a_{2i} \times Y^{2i} \quad (1)$$

where:

Y represents a perpendicular distance between an arbitrary point on the aspherical surface and the optical axis (I);

Z represents a depth of an aspherical surface, which is defined as a perpendicular distance between the arbitrary point on the aspherical surface that is spaced apart from the optical axis (I) by a distance Y, and a tangent plane at a vertex of the aspherical surface at the optical axis (I);

R represents a radius of curvature of the aspherical surface;

K represents a conic constant; and $a_{2i}$ represents a $2i^{th}$ aspherical coefficient.

Shown in FIG. 4 is a table that lists values of some aspherical parameters of the aforementioned relationship (1) corresponding to the first preferred embodiment.

Relationships among some lens parameters corresponding to the first preferred embodiment are listed in FIG. 30, where:

T1 represents a thickness of the first lens element 3 at the optical axis (I);

T2 represents a thickness of the second lens element 4 at the optical axis (I);

T3 represents a thickness of the third lens element 5 at the optical axis (I);

T4 represents a thickness of the fourth lens element 6 at the optical axis (I);

G12 represents an air gap length between the first lens element 3 and the second lens element 4 at the optical axis (I);

G23 represents an air gap length between the second lens element 4 and the third lens element 5 at the optical axis (I);

TTL represents a distance between the object-side surface 31 of the first lens element 3 and the image plane 8 at the optical axis (I);

BFL represents a distance at the optical axis (I) between the image-side surface 62 of the fourth lens element 6 and the image plane 8;

ALT represents a sum of thicknesses of the lens elements 3-6 at the optical axis (I);

Gaa represents a sum of air gap lengths among the first lens element 3, the second lens element 4, the third lens element 5 and the fourth lens element 6 at the optical axis (I); and EFL represents a system focal length of the imaging lens 10.

FIGS. 5(a) to 5(d) respectively show simulation results corresponding to longitudinal spherical aberration, sagittal astigmatism aberration, tangential astigmatism aberration, and distortion aberration of the first preferred embodiment. In each of the simulation results, curves corresponding respectively to wavelengths of 470 nm, 550 nm, and 650 nm are shown.

Figures 5A, 5B, 5C, 5D:
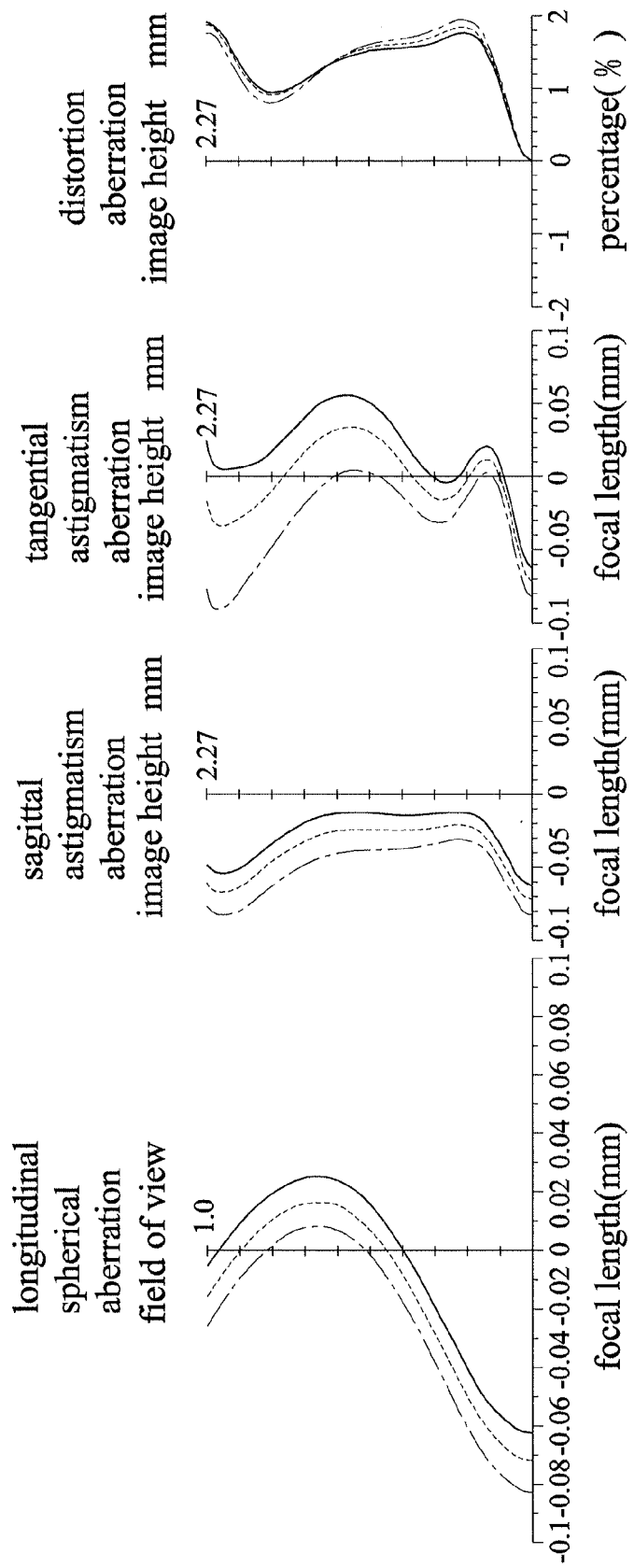
FIGS. 5(a) to 5(d) show different optical characteristics of the imaging lens of the first preferred embodiment.

It can be understood from FIG. 5(a) that, since each of the curves corresponding to longitudinal spherical aberration has a focal length at each field of view (indicated by the vertical axis) that falls within the range of ±0.1 mm, the first preferred embodiment is able to achieve a relatively low spherical aberration at each of the wavelengths. Furthermore, since the curves at each field of view are close to each other, the first preferred embodiment has a relatively low chromatic aberration.

It can be understood from FIGS. 5(b) and 5(c) that, since each of the curves falls within the range of ±0.1 mm of focal length, the first preferred embodiment has a relatively low optical aberration.

Moreover, as shown in FIG. 5(d), since each of the curves corresponding to distortion aberration falls within the range of ±2%, the first preferred embodiment is able to meet requirements in imaging quality of most optical systems.

In view of the above, even with the system length reduced down to 3.88 mm, the imaging lens 10 of the first preferred embodiment is still able to achieve a relatively good optical performance.

Figure 6:
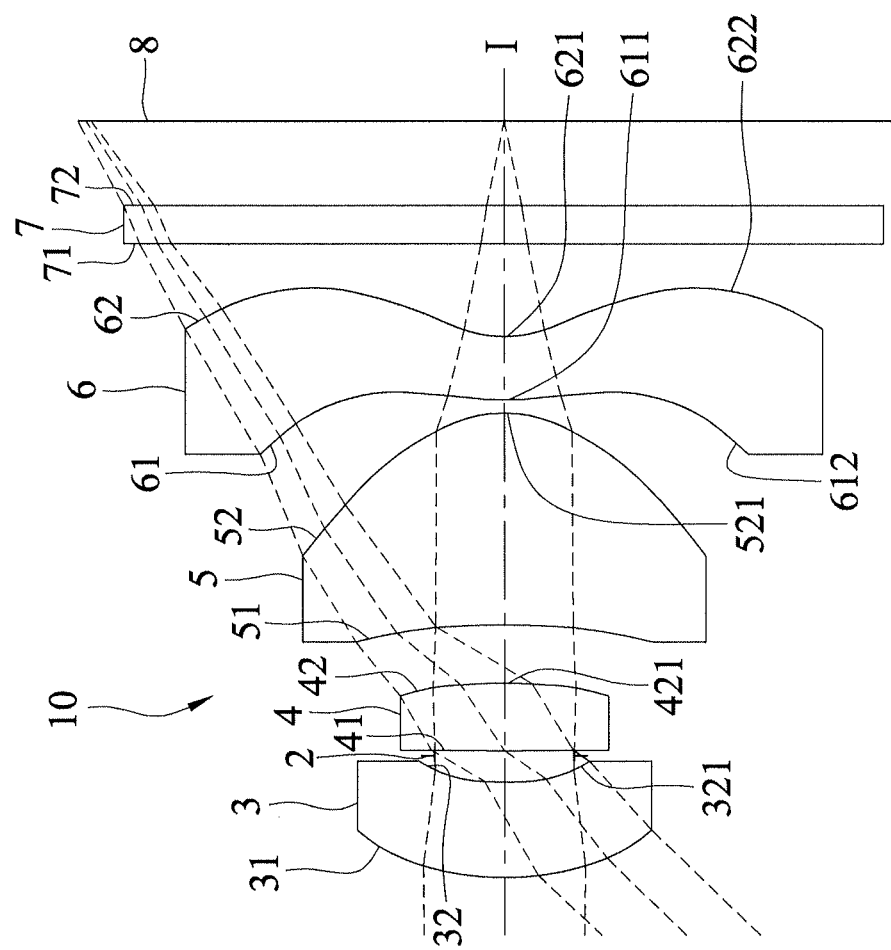
FIG. 6 is a schematic diagram that illustrates the second preferred embodiment of an imaging lens according to the present invention.
Figures 9A, 9B, 9C, 9D:
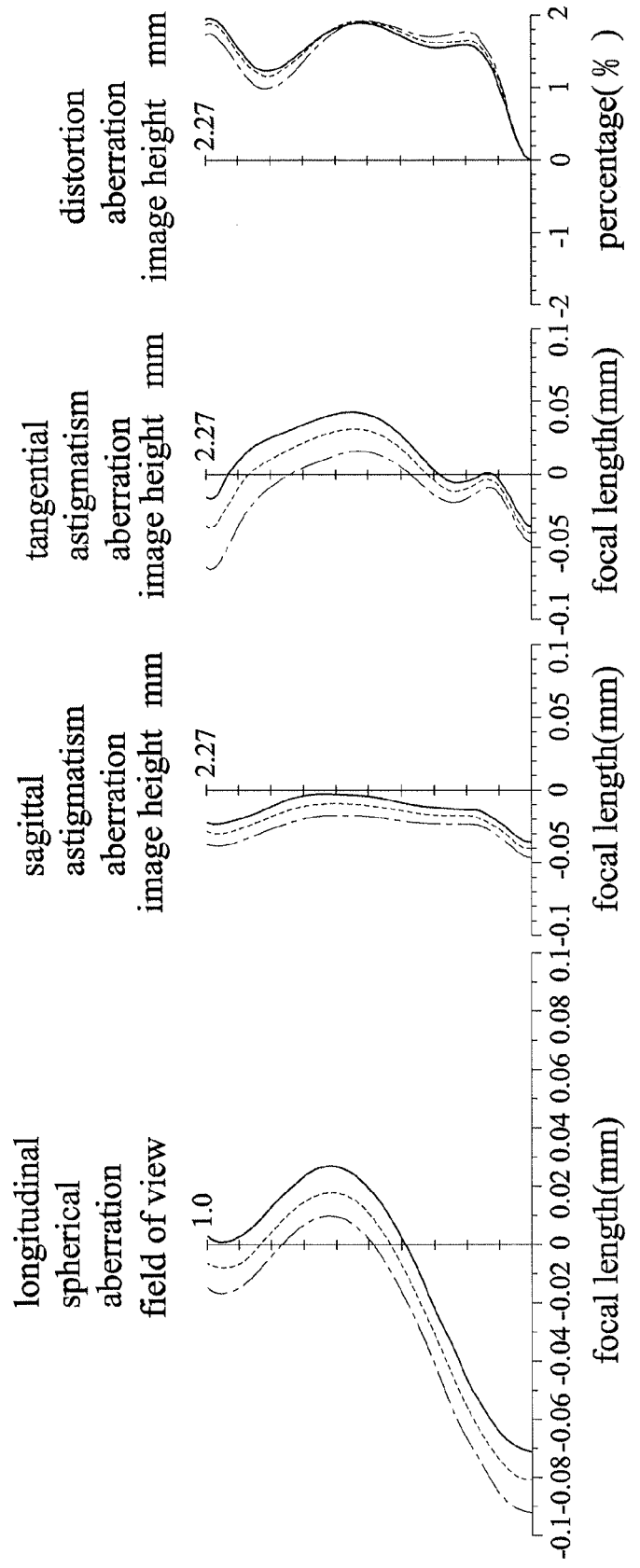
FIGS. 9(a) to 9(d) show different optical characteristics of the imaging lens of the second preferred embodiment.

FIG. 6 illustrates the second preferred embodiment of the imaging lens 10 according to the present invention, which has a configuration similar to that of the first preferred embodiment.

Shown in FIG. 7 is a table that lists values of some optical parameters corresponding to the surfaces 31, 41, 51, 61, 71, 32, 42, 52, 62, 72 of the second preferred embodiment. The imaging lens 10 has an overall system focal length of 2.090 mm, an HFOV of 45.880°, an F-number of 2.49, and a system length of 4.11 mm.

Shown in FIG. 8 is a table that lists values of some aspherical parameters of the aforementioned relationship (1) corresponding to the second preferred embodiment.

Relationships among some of the aforementioned lens parameters corresponding to the second preferred embodiment are listed in FIG. 30.

FIGS. 9(a) to 9(d) respectively show simulation results corresponding to longitudinal spherical aberration, sagittal astigmatism aberration, tangential astigmatism aberration, and distortion aberration of the second preferred embodiment. It can be understood from FIGS. 9(a) to 9(d) that the second preferred embodiment is able to achieve a relatively good optical performance.

Figure 10:
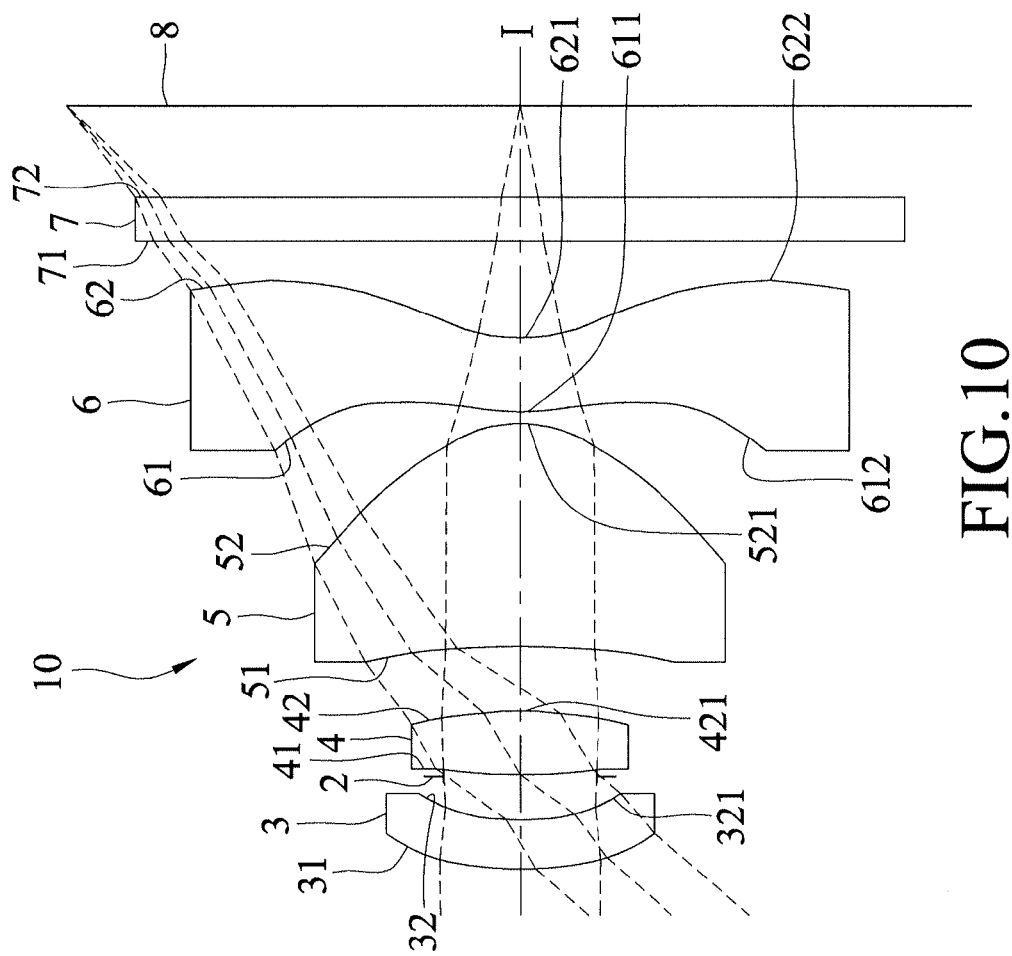
FIG. 10 is a schematic diagram that illustrates the third preferred embodiment of an imaging lens according to the present invention.

FIG. 10 illustrates the third preferred embodiment of the imaging lens 10 according to the present invention, which has a configuration similar to that of the first preferred embodiment.

Shown in FIG. 11 is a table that lists values of some optical parameters corresponding to the surfaces 31, 41, 51, 61, 71,

32, 42, 52, 62, 72 of the third preferred embodiment. The imaging lens 10 has an overall system focal length of 1.929 mm, an HFOV of 49.294°, an F-number of 2.48, and a system length of 3.81 mm.

Shown in FIG. 12 is a table that lists values of some aspherical parameters of the aforementioned relationship (1) corresponding to the third preferred embodiment.

Relationships among some of the aforementioned lens parameters corresponding to the third preferred embodiment are listed in FIG. 30.

Figures 13A, 13B, 13C, 13D:
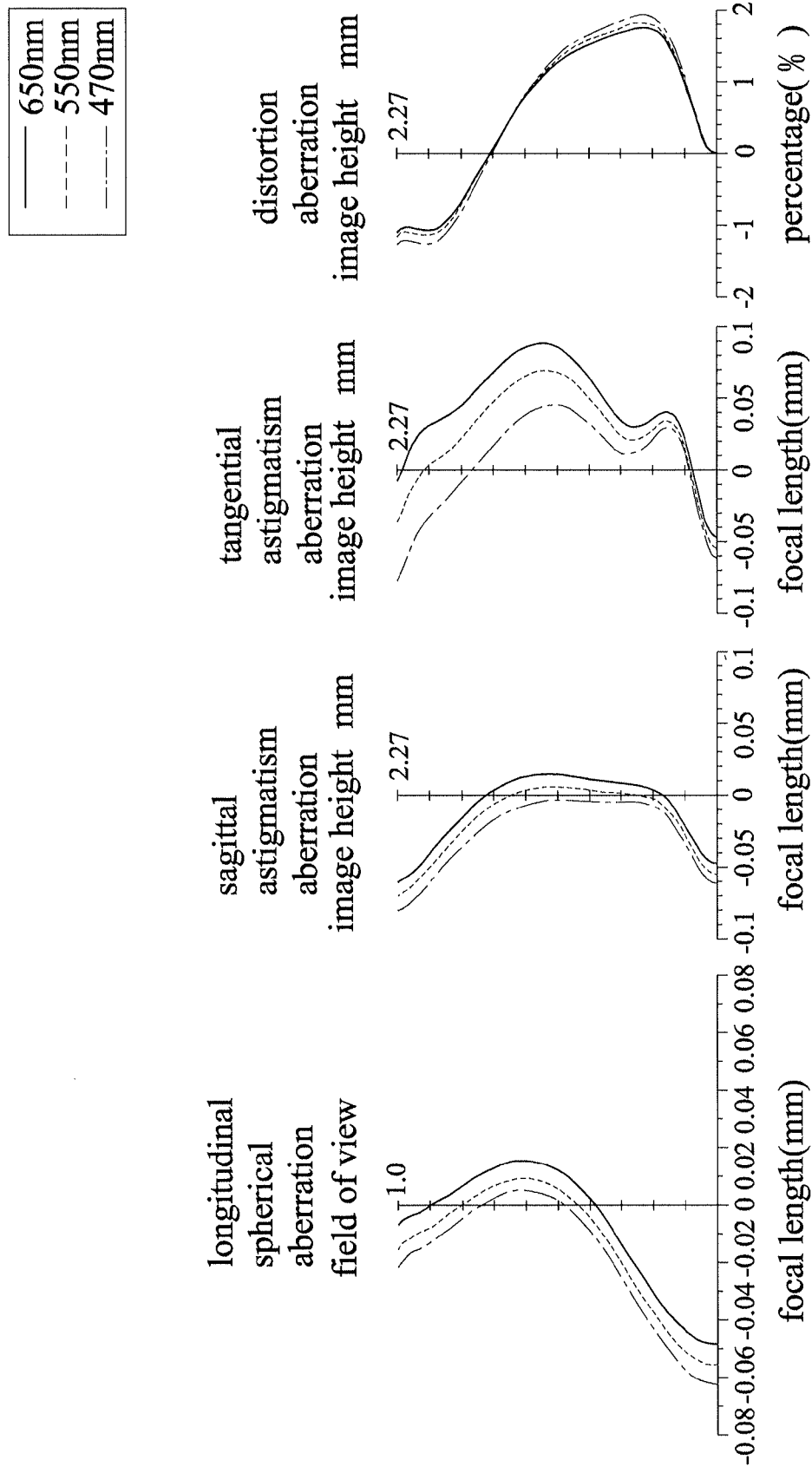
FIGS. 13(a) to 13(d) show different optical characteristics of the imaging lens of the third preferred embodiment.

FIGS. 13(*a*) to 13(*d*) respectively show simulation results corresponding to longitudinal spherical aberration, sagittal astigmatism aberration, tangential astigmatism aberration, and distortion aberration of the third preferred embodiment. It can be understood from FIGS. 13(*a*) to 13(*d*) that the third preferred embodiment is able to achieve a relatively good optical performance.

Figure 14:
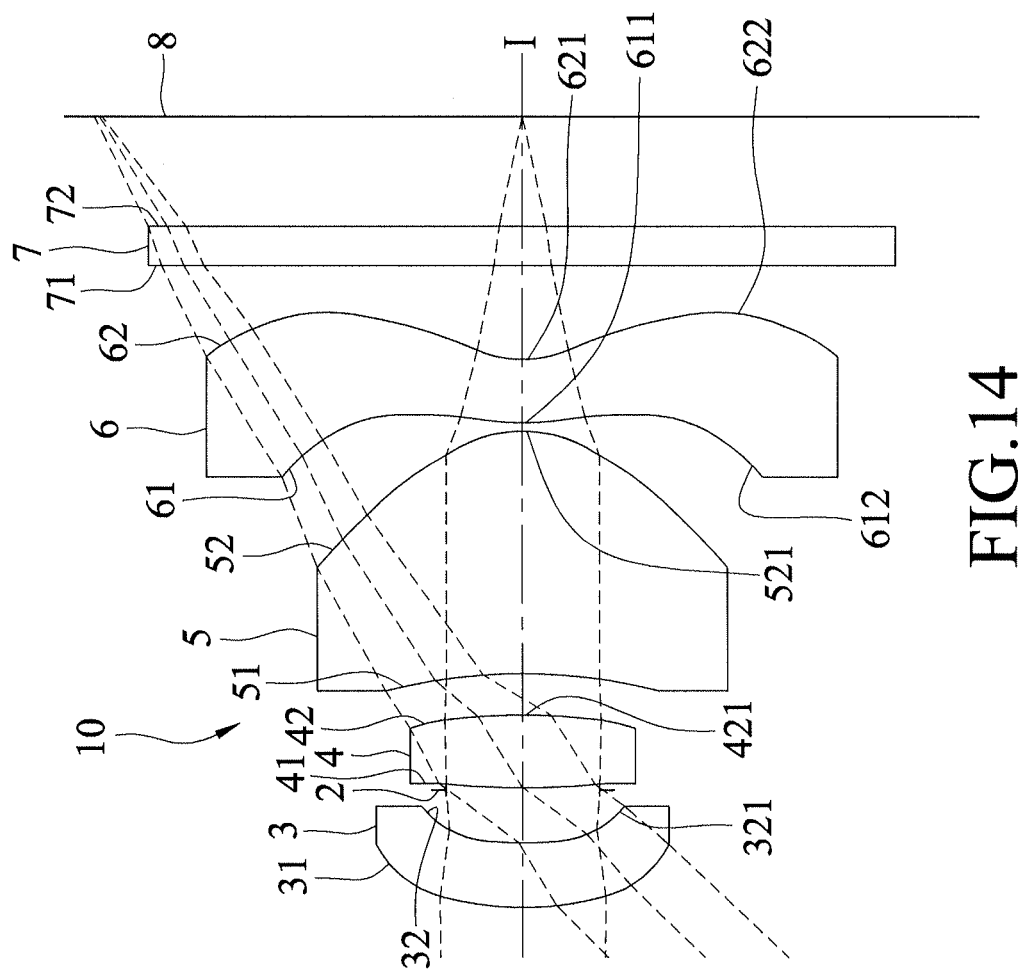
FIG. 14 is a schematic diagram that illustrates the fourth preferred embodiment of an imaging lens according to the present invention.

FIG. 14 illustrates the fourth preferred embodiment of the imaging lens 10 according to the present invention, which has a configuration similar to that of the first preferred embodiment.

Shown in FIG. 15 is a table that lists values of some optical parameters corresponding to the surfaces 31, 41, 51, 61, 71, 32, 42, 52, 62, 72 of the fourth preferred embodiment. The imaging lens 10 has an overall system focal length of 2.128 mm, an HFOV of 46.406°, an F-number of 2.42, and a system length of 4.25 mm.

Shown in FIG. 16 is a table that lists values of some aspherical parameters of the aforementioned optical relationship (1) corresponding to the fourth preferred embodiment.

Relationships among some of the aforementioned lens parameters corresponding to the fourth preferred embodiment are listed in FIG. 30.

Figure 17:
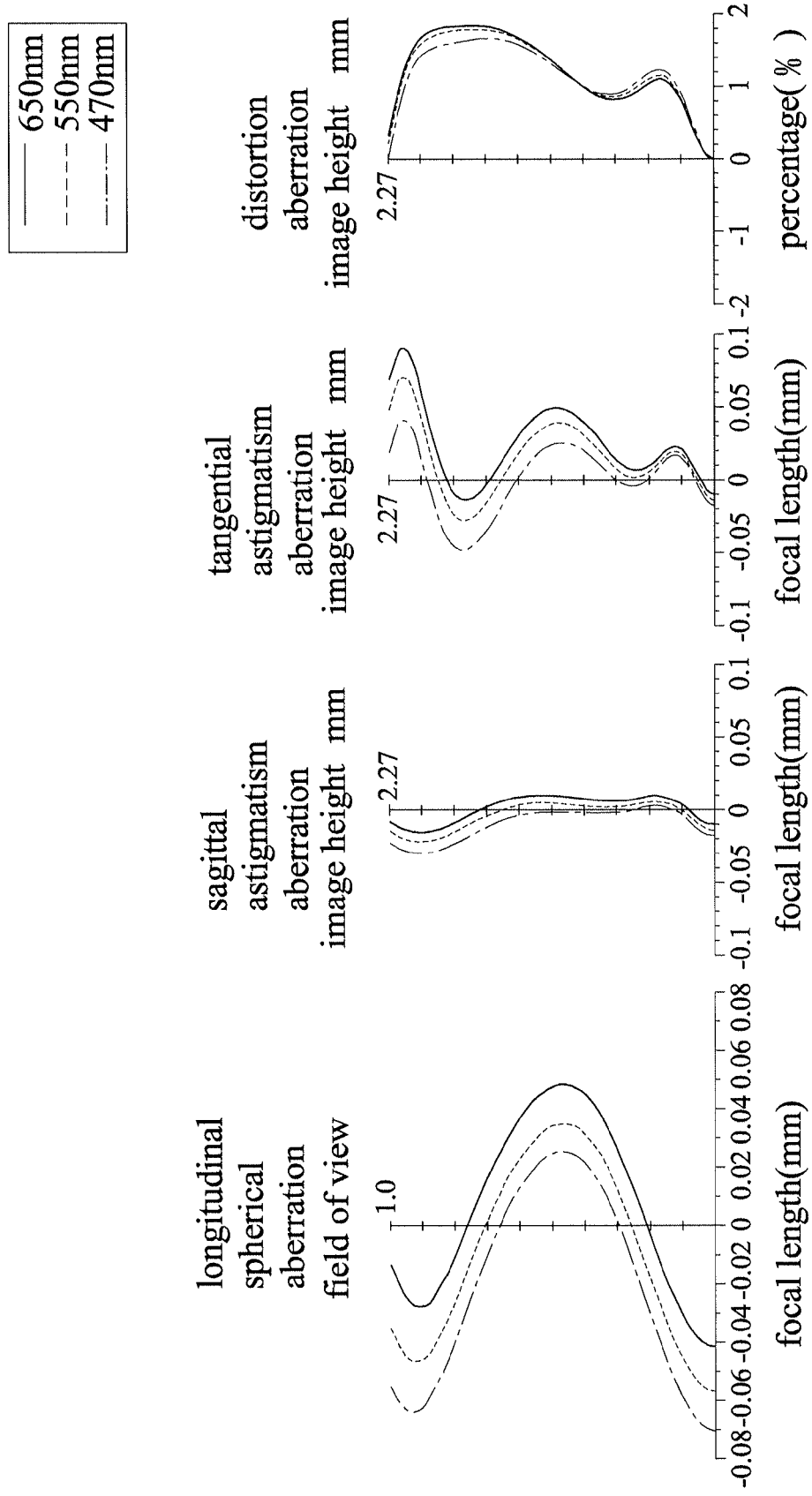
FIGS. 17(a) to 17(d) show different optical characteristics of the imaging lens of the fourth preferred embodiment.

FIGS. 17(*a*) to 17(*d*) respectively show simulation results corresponding to longitudinal spherical aberration, sagittal astigmatism aberration, tangential astigmatism aberration, and distortion aberration of the fourth preferred embodiment. It can be understood from FIGS. 17(*a*) to 17(*d*) that the fourth preferred embodiment is able to achieve a relatively good optical performance.

Figure 18:
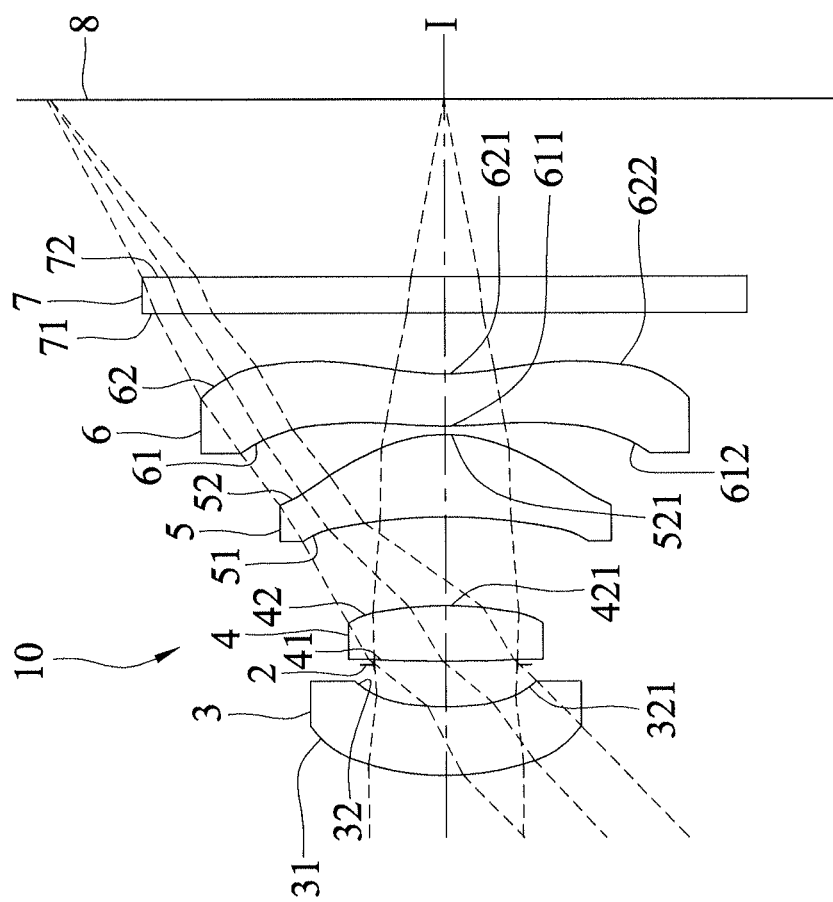
FIG. 18 is a schematic diagram that illustrates the fifth preferred embodiment of an imaging lens according to the present invention.

FIG. 18 illustrates the fifth preferred embodiment of the imaging lens 10 according to the present invention, which has a configuration similar to that of the first preferred embodiment.

Shown in FIG. 19 is a table that lists values of some optical parameters corresponding to the surfaces 31, 41, 51, 61, 71, 32, 42, 52, 62, 72 of the fifth preferred embodiment. The imaging lens 10 has an overall system focal length of 2.361 mm, an HFOV of 43.78°, an F-number of 2.60, and a system length of 3.88 mm.

Shown in FIG. 20 is a table that lists values of some aspherical parameters of the aforementioned relationship (1) corresponding to the fifth preferred embodiment.

Relationships among some of the aforementioned lens parameters corresponding to the fifth preferred embodiment are listed in FIG. 30.

Figure 21:
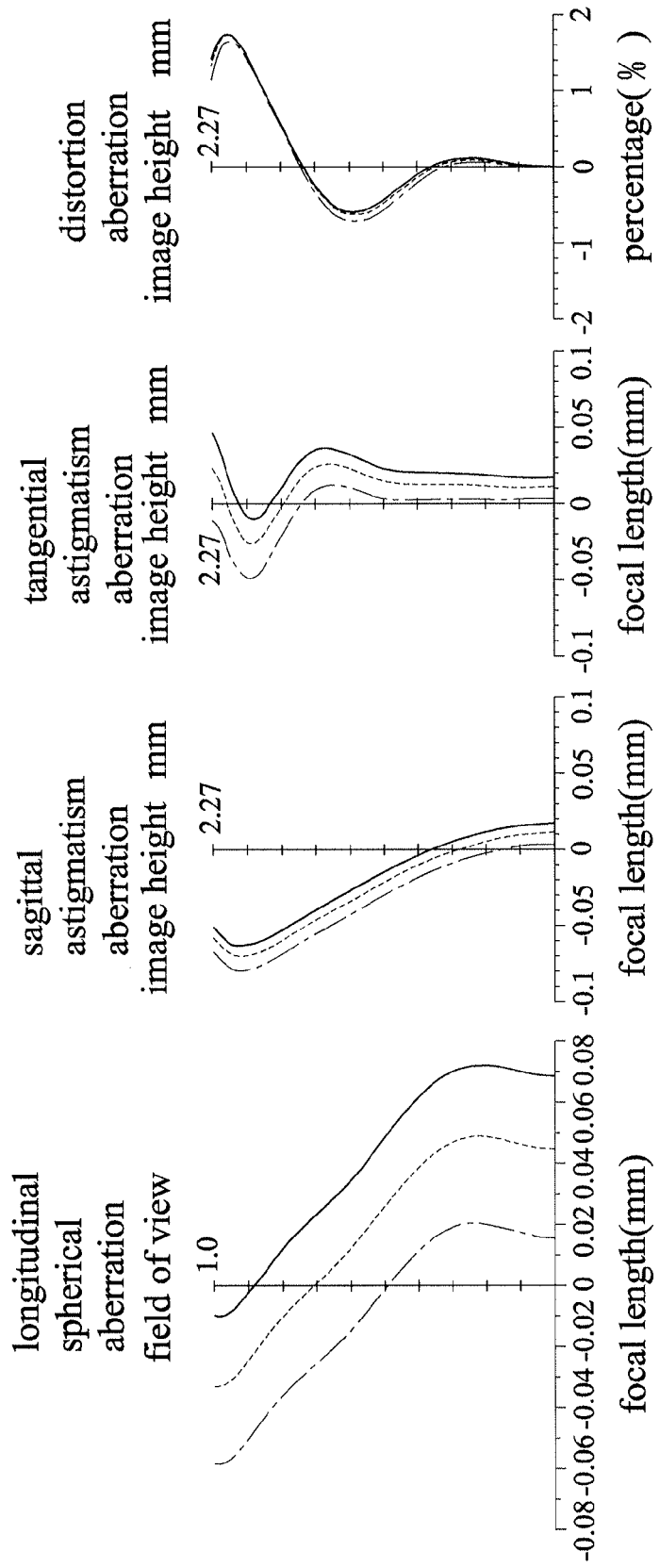
FIGS. 21(*a*) to 21(*d*) show different optical characteristics of the imaging lens of the fifth preferred embodiment.

FIGS. 21(*a*) to 21(*d*) respectively show simulation results corresponding to longitudinal spherical aberration, sagittal astigmatism aberration, tangential astigmatism aberration, and distortion aberration of the fifth preferred embodiment. It can be understood from FIGS. 21(*a*) to 21(*d*) that the fifth preferred embodiment is able to achieve a relatively good optical performance.

Figure 22:
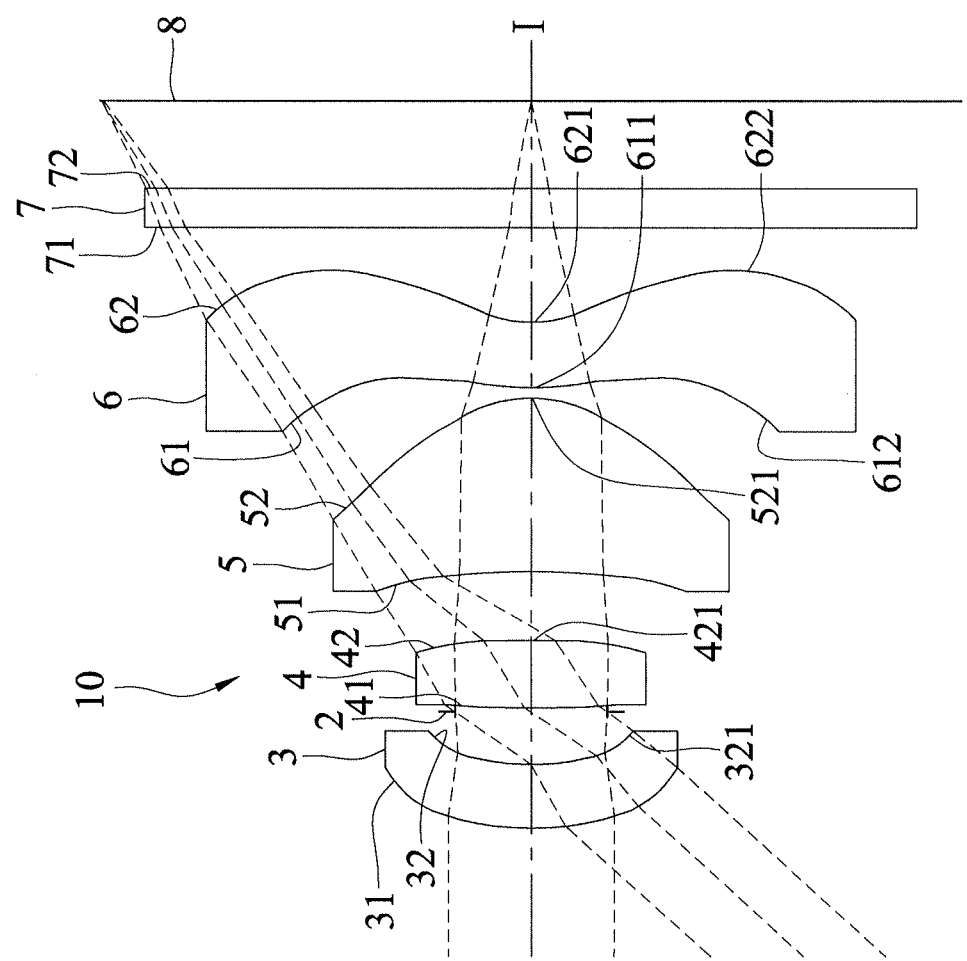
FIG. 22 is a schematic diagram that illustrates the sixth preferred embodiment of an imaging lens according to the present invention.

FIG. 22 illustrates the sixth preferred embodiment of an imaging lens 10 according to the present invention, which has a configuration similar to that of the first preferred embodiment.

Shown in FIG. 23 is a table that lists values of some optical parameters corresponding to the surfaces 31, 41, 51, 61, 71, 32, 42, 52, 62, 72 of the sixth preferred embodiment. The imaging lens 10 has an overall system focal length of 2.077 mm, an HFOV of 47.748°, an F-number of 2.42, and a system length of 3.84 mm.

Shown in FIG. 24 is a table that lists values of some aspherical parameters of the aforementioned relationship (1) corresponding to the sixth preferred embodiment.

Relationships among some of the aforementioned lens parameters corresponding to the sixth preferred embodiment are listed in FIG. 30.

Figures 25A, 25B, 25C, 25D:
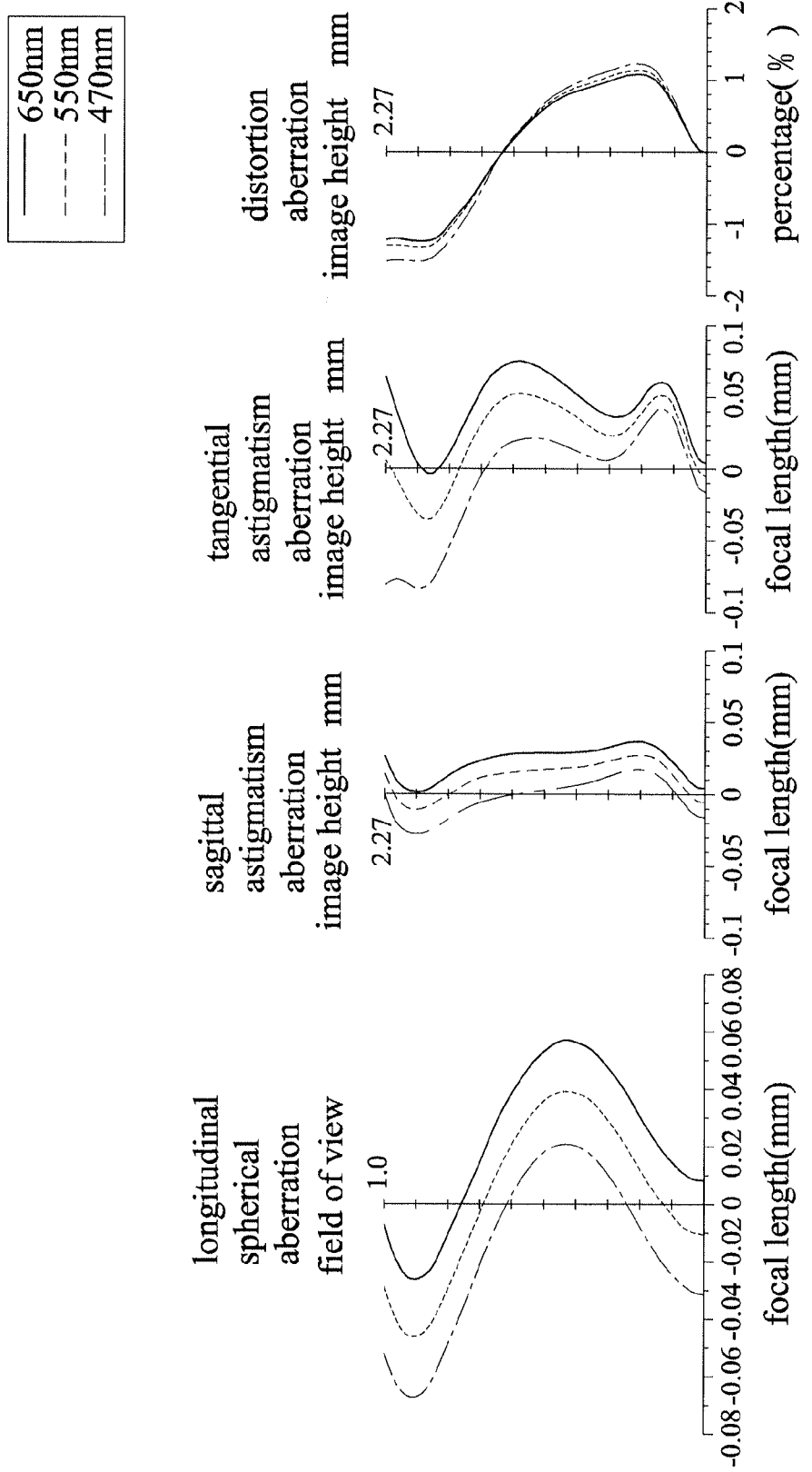
FIGS. 25(*a*) to 25(*d*) show different optical characteristics of the imaging lens of the sixth preferred embodiment.

FIGS. 25(*a*) to 25(*d*) respectively show simulation results corresponding to longitudinal spherical aberration, sagittal astigmatism aberration, tangential astigmatism aberration, and distortion aberration of the sixth preferred embodiment. It can be understood from FIGS. 25(*a*) to 25(*d*) that the sixth preferred embodiment is able to achieve a relatively good optical performance.

Figure 26:
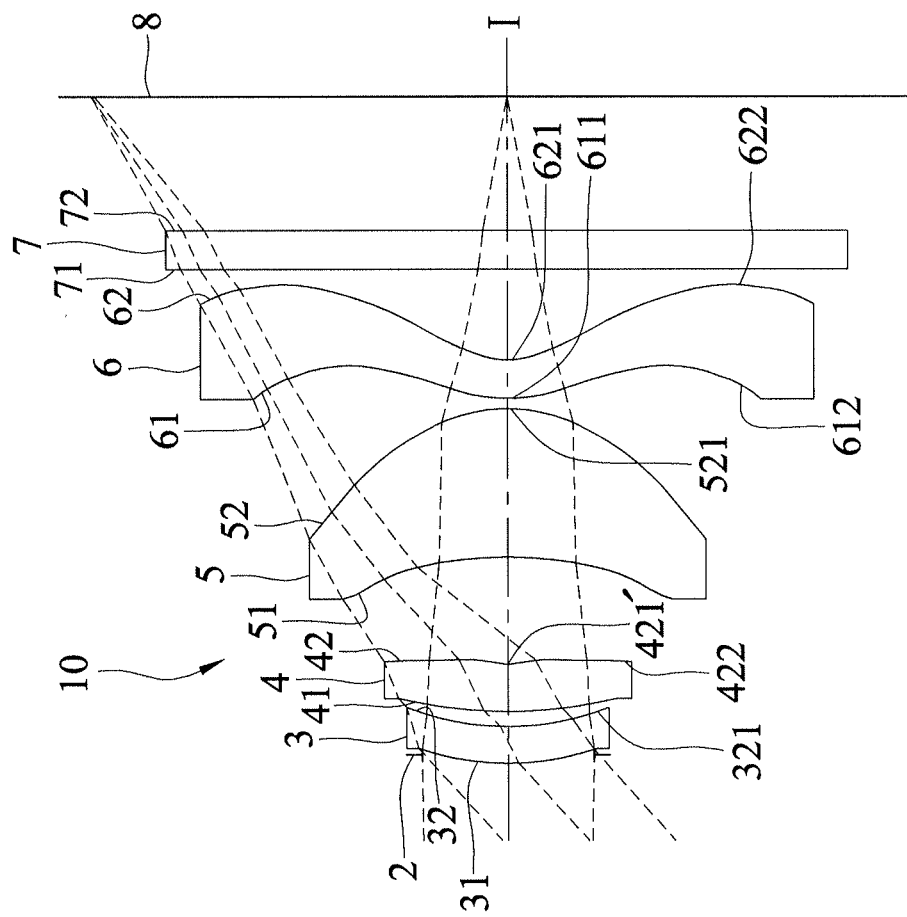
FIG. 26 is a schematic diagram that illustrates the seventh preferred embodiment of an imaging lens according to the present invention.

Referring to FIG. 26, the differences between the first and seventh preferred embodiments of the imaging lens 10 of this invention reside in that: the aperture stop 2 is arranged between the first lens element 3 and the to-be-captured object; the first lens element 3 has a positive refractive power; and the image-side surface 42 of the second lens element 4 has a concave portion 421' in a vicinity of the optical axis (I), and a convex portion 422 in a vicinity of a periphery of the second lens element 4.

Shown in FIG. 27 is a table that lists values of some optical parameters corresponding to the surfaces 31, 41, 51, 61, 71, 32, 42, 52, 62, 72 of the seventh preferred embodiment. The imaging lens 10 has an overall system focal length of 2.464 mm, an HFOV of 42.503°, an F-number of 2.61, and a system length of 3.64 mm.

Shown in FIG. 28 is a table that lists values of some aspherical parameters of the aforementioned relationship (1) corresponding to the seventh preferred embodiment.

Relationships among some of the aforementioned lens parameters corresponding to the seventh preferred embodiment are listed in FIG. 30.

Figures 29A, 29B, 29C, 29D:
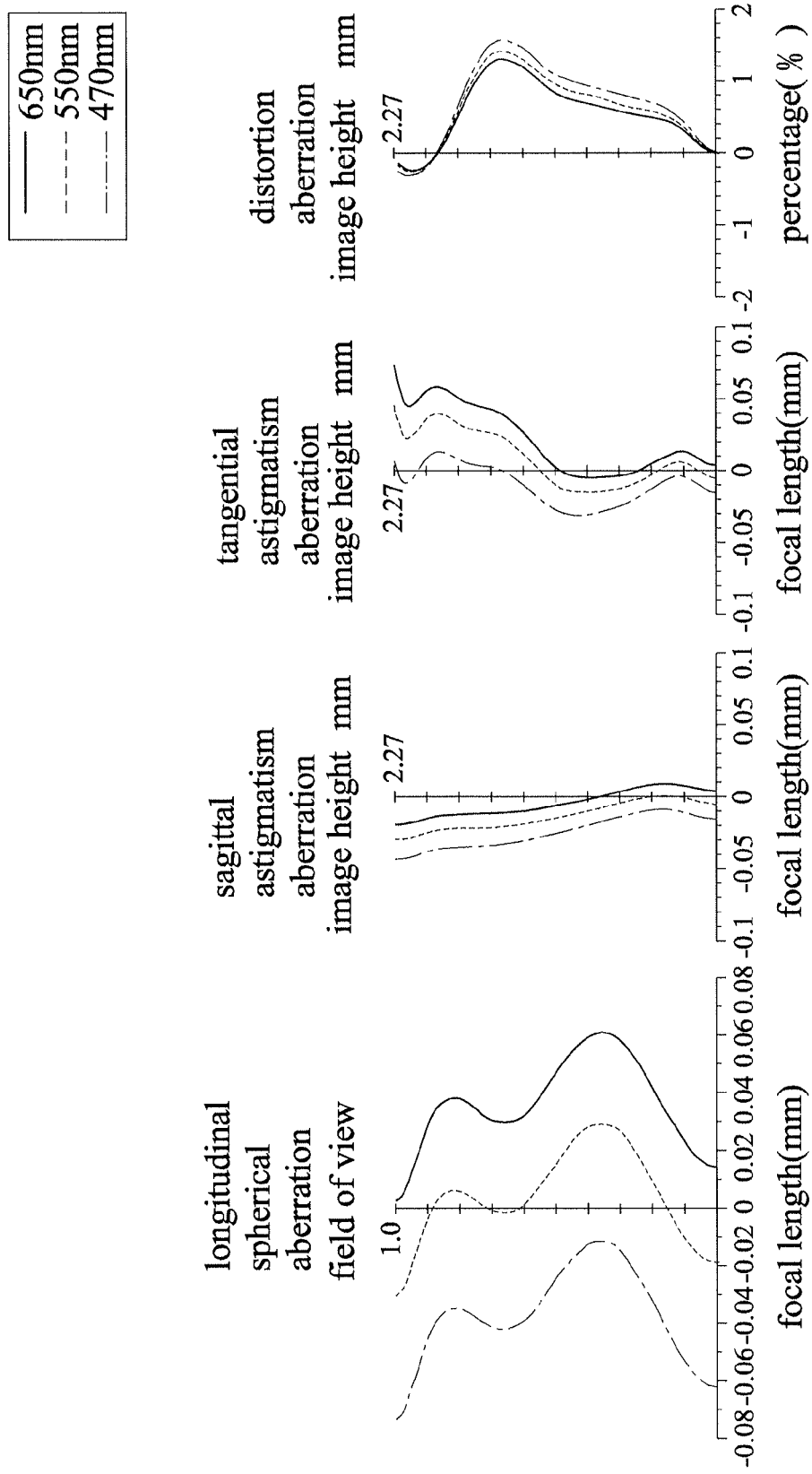
FIGS. 29(*a*) to 29(*d*) show different optical characteristics of the imaging lens of the seventh preferred embodiment.

FIGS. 29(*a*) to 29(*d*) respectively show simulation results corresponding to longitudinal spherical aberration, sagittal astigmatism aberration, tangential astigmatism aberration, and distortion aberration of the seventh preferred embodiment. It can be understood from FIGS. 29(*a*) to 29(*d*) that the seventh preferred embodiment is able to achieve a relatively good optical performance.

Shown in FIG. 30 is a table that lists the aforesaid relationships among some of the aforementioned lens parameters corresponding to the seven preferred embodiments for comparison, and it should be noted that the values of the lens parameters and the relationships listed in FIG. 34 are rounded off to the second decimal place. When each of the lens parameters of the imaging lens 10 according to this invention satisfies the following optical relationships, the optical performance is still relatively good even with the reduced system length:

(1) $2.5 \leq BFL/G23$: One of the objects of the present invention is to achieve a large field of view. Shorter EFL favors not only enlargement of the field of view, but also reduction of BFL. In order to reduce the system length, all of the lens parameters are preferred to be reduced. Furthermore, since the image-side surface 42 and the object-side surface 51 are not limited in surface shapes, G23 may have effective reduction to meet requirements of a wide field of view and a short system length. Preferably, $2.5 \leq BFL/G23 \leq 6.5$.

(2) $EFL/T3 \leq 5$: Shorter EFL favors enlargement of the field of view. Since the image-side surface 52 of the third lens element 5 has the convex portion 521 in a vicinity of the optical axis (I), T3 has a relatively small reducible ratio. Therefore, the design of $EFL/T3$ tends to be small. Preferably, $1.3 \leq EFL/T3 \leq 5$.

(3) $2.15 \leq BFL/T1$: As mentioned above, BFL may be reduced. In addition, since the first lens element 3 has no limitation in the area near the optical axis (I), a reducible ratio of T1 is not limited. When this relationship is satisfied, T1 may be effectively reduced, favoring reduction of the imaging lens 10. Preferably, $2.15 \leq BFL/T1 \leq 7.5$.

(4) $3.9 \leq BFL/G12 \leq 17$: As mentioned above, BFL may be reduced. On the other hand, G12 should have sufficient length to allow light entering the second lens element 4 at a suitable height. Considering optical performance and manufacturing ability, better arrangements of BFL and G12 may be achieved when this relationship is satisfied.

(5) $ALT/G23 \leq 11$: As mentioned above, G23 may have an effective reduction. In addition, ALT is large compared to other lens parameters. It further favors reduction of the system length of the imaging lens 10 if reduction of ALT is greater than that of G23. Preferably, $2 \leq ALT/G23 \leq 11$.

(6) $7.8 \leq ALT/G12 \leq 17.8$: As mentioned above, ALT may have a relatively large reducible ratio, and G12 should have sufficient length to allow light entering the second lens element 4 at a suitable height. Considering optical performance and manufacturing ability, better arrangements of ALT and G12 may be achieved when this relationship is satisfied.

(7) $1.15 \leq T3/Gaa$: Since the image-side surface 52 of the third lens element 5 has the convex portion 521 in a vicinity of the optical axis (I), T3 has a relatively small reducible ratio. Aside from that G12 should have a sufficient length, G23 may be reduced with less limitation, so that Gaa has a relative large reducible ratio. Preferably, $1.15 \leq T3/Gaa \leq 2.8$.

(8) $2.85 \leq T3/G23$: As mentioned above, since T3 has a relatively small reducible ratio, while G23 has a relatively large reducible ratio, design of $T3/G23$ tends to be large. Preferably, $2.85 \leq T3/G23 \leq 6.5$.

(9) $4.4 \leq ALT/T2$: As mentioned above, ALT has a large reducible ratio. Since the second lens element 4 has the positive refractive power, T2 may be made thicker. However, it favors reduction of the system total length of the imaging lens 10 if T2 also has effective reduction. The system length may be effectively reduced when ALT/T2 is designed to be large. Preferably, $4.4 \leq ALT/T2 \leq 8$.

(10) $5.1 \leq ALT/T1$: As mentioned above, ALT has a large reducible ratio, and T1 may be effective reduced when $ALT/T1$ is designed to be large. Preferably, $5.1 \leq ALT/T1 \leq 9$.

(11) $3 \leq T3/G12$: Since the image-side surface 52 of the third lens element 5 has the convex portion 521 in a vicinity of the optical axis (I), T3 has a relatively small reducible ratio. On the other hand, G12 should have sufficient length to allow light entering the second lens element 4 at a suitable height. Thus, both of T3 and G12 are limited in amount of reduction. However, since adjacent surfaces of G12 do not have limitations in shape, G12 has a relatively large reducible ratio compared to T3, so that design of T3/G12 tends to be large. Preferably, $3 \leq T3/G12 \leq 10$.

(12) $1.55 \leq T3/T4$: Since the object of the present invention is to achieve a wide field of view and to reduce the system length of the imaging lens 10, light should be converged within a shorter distance. In addition, since the image-side surface 52 of the third lens element 5 has the convex portion 521 in a vicinity of the optical axis (I), light has a shorter distance to be converged after refraction at the convex portion 521, so that the fourth lens element 6 should be made thinner in order to favor arrangement of BFL. Therefore, design of T3/T4 tends to be large. Preferably, $1.55 \leq T3/T4 \leq 4.2$.

To sum up, effects and advantages of the imaging lens 10 according to the present invention are described hereinafter.

1. The second lens element 4 with the positive refractive power may provide a portion of required positive refractive power of the imaging lens 10. In addition, by virtue of the concave portion 321, the convex portion 521, the concave portion 621 and the convex portion 622, optical aberration of the image may be corrected. Furthermore, when the aperture stop 2 is arranged between the first lens element 3 and the second lens element 4, field of view may be enlarged. If the image-side surface 42 of the second lens element 4 has the convex portion 421 in a vicinity of the optical axis (I), correction of optical aberration may be further enhanced.

2. Through design of the relevant optical parameters, such as BFL/G23, EFL/T3, BFL/T1, BFL/G12, ALT/G23, ALT/G12, T3/Gaa, T3/G23, ALT/G12, T3/Gaa, T3/G23, ALT/T2, ALT/T1, T3/G12 and T3/T4, optical aberrations, such as spherical aberration, may be reduced or even eliminated. Further, through surface design and arrangement of the lens elements 3-6, even with the system length reduced, optical aberrations may still be reduced or even eliminated, resulting in relatively good optical performance.

3. Through the aforesaid seven preferred embodiments, it is known that the system length of this invention may be reduced down to below 4.25 mm, so as to facilitate developing thinner relevant products with economic benefits.

Figure 31:
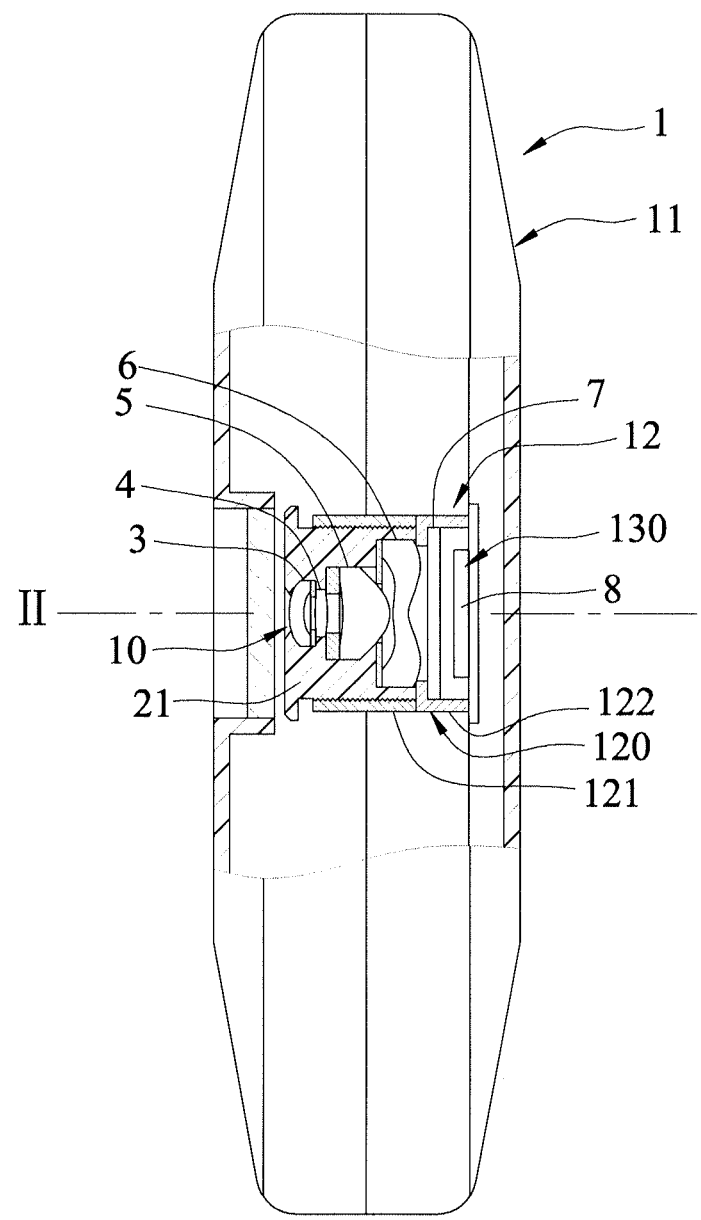
FIG. 31 is a schematic partly sectional view to illustrate a first exemplary application of the imaging lens of the present invention.

Shown in FIG. 31 is a first exemplary application of the imaging lens 10, in which the imaging lens 10 is disposed in a housing 11 of an electronic apparatus 1 (such as a mobile phone, but not limited thereto), and forms a part of an imaging module 12 of the electronic apparatus 1. The imaging module 12 includes a barrel 21 on which the imaging lens 10 is disposed, a holder unit 120 on which the barrel 21 is disposed, and an image sensor 130 disposed at the image plane 8 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 32:
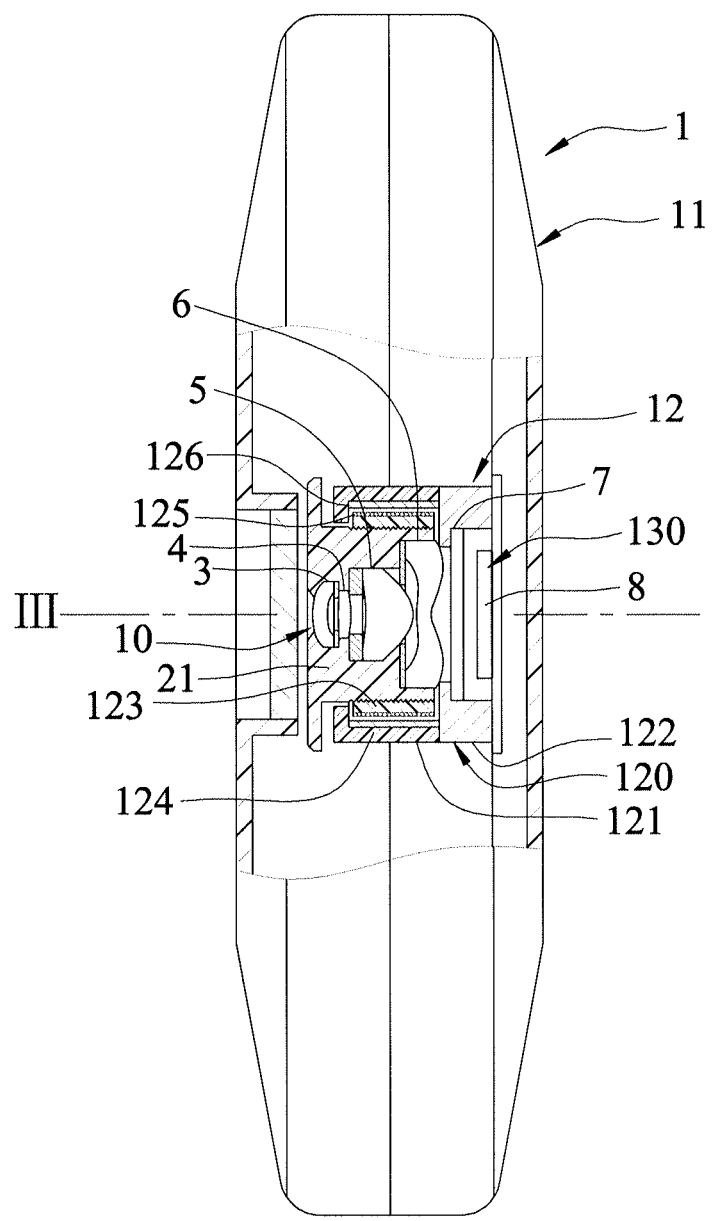
FIG. 32 is a schematic partly sectional view to illustrate a second exemplary application of the imaging lens of the present invention.

Shown in FIG. 32 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 7 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising a first lens element, a second lens element, a third lens element and a fourth lens element arranged in order from an object side to an image side along an optical axis of said imaging lens, each of said first lens element, said second lens element, said third lens element and said fourth lens element having a refractive power, an object-side surface facing toward the object side, and an image-side surface facing toward the image side, wherein:
   said image-side surface of said first lens element has a concave portion in a vicinity of a periphery of said first lens element;
   said second lens element has a positive refractive power;
   said image-side surface of said third lens element has a convex portion in a vicinity of the optical axis;
   said fourth lens element has a negative refractive power, and said image-side surface of said fourth lens element has a concave portion in a vicinity of the optical axis and a convex portion in a vicinity of a periphery of said fourth lens element;
   said imaging lens does not include any lens element with refractive power other than said first lens element, said second lens element, said third lens element and said fourth lens element; and
   said imaging lens satisfies $2.5 \leq BFL/G23 \leq 6.5$ and $3.9 \leq BFL/G12 \leq 17$, where BFL represents a distance at the optical axis between said image-side surface of said fourth lens element and an image plane at the image side, G23 represents an air gap length between said second lens element and said third lens element at the optical axis, and G12 represents an air gap length between said first lens element and said second lens element at the optical axis.

2. The imaging lens as claimed in claim 1, further satisfying $1.3 \leq EFL/T3 \leq 5$, where EFL represents a system focal length of said imaging lens, and T3 represents a thickness of said third lens element at the optical axis.

3. The imaging lens as claimed in claim 2, further satisfying $2.15 \leq BFL/T1 \leq 7.5$, where T1 represents a thickness of said first lens element at the optical axis.

4. The imaging lens as claimed in claim 2, further satisfying $2 \leq ALT/G23 \leq 11$, where ALT represents a sum of thicknesses of said first lens element, said second lens element, said third lens element and said fourth lens element at the optical axis.

5. The imaging lens as claimed in claim 4, further satisfying $1.15 \leq T3/Gaa \leq 2.8$, where Gaa represents a sum of air gap lengths among said first lens element, said second lens element, said third lens element and said fourth lens element at the optical axis.

6. The imaging lens as claimed in claim 5, further satisfying $7.8 \leq ALT/G12 \leq 17.8$.

7. The imaging lens as claimed in claim 1, further satisfying $2 \leq ALT/G23 \leq 11$, where ALT represents a sum of thicknesses of said first lens element, said second lens element, said third lens element and said fourth lens element at the optical axis.

8. The imaging lens as claimed in claim 7, further satisfying $2.85 \leq T3/G23 \leq 6.5$, where T3 represents a thickness of said third lens element at the optical axis.

9. The imaging lens as claimed in Claim 7, further satisfying $4.4 \leq ALT/T2 \leq 8$, where T2 represents the thickness of said second lens element at the optical axis.

10. The imaging lens as claimed in Claim 7, further satisfying $5.1 \leq ALT/T1 \leq 9$, where T1 represents the thickness of said first lens element at the optical axis.

11. The imaging lens as claimed in claim 1, satisfying $2.15 \leq BFL/T1 \leq 7.5$, where T1 represents a thickness of said first lens element at the optical axis.

12. The imaging lens as claimed in claim 11, further satisfying $3 \leq T3/G12 \leq 10$, where T3 represents a thickness of said third lens element at the optical axis.

13. The imaging lens as claimed in claim 12, wherein said image-side surface of said second lens element has a convex portion in a vicinity of the optical axis.

14. The imaging lens as claimed in claim 11, further satisfying $1.55 \leq T3/T4 \leq 4.2$, where T3 represents a thickness of said third lens element at the optical axis, and T4 represents a thickness of said fourth lens element at the optical axis.

15. The imaging lens as claimed in claim 14, further comprising an aperture stop arranged between said first lens element and said second lens element.

16. An electronic apparatus comprising:
   a housing; and
   an imaging module disposed in said housing, and including an imaging lens as claimed in claim 1, a barrel on which said imaging lens is disposed, a holder unit on which said barrel is disposed, and an image sensor disposed at the image side of said imaging lens.

* * * * *